United States Patent [19]
Minefuji et al.

[11] Patent Number: 5,600,488
[45] Date of Patent: Feb. 4, 1997

[54] PROJECTION LENS ASSEMBLY AND PROJECTOR

[75] Inventors: Nobutaka Minefuji; Yasuyuki Tejima; Masakazu Yamagata, all of Tokyo, Japan

[73] Assignees: Casio Computer Co., Ltd.; Asahi Kogaku Kogyo Kabushiki Kaisha, both of Tokyo, Japan

[21] Appl. No.: 512,398

[22] Filed: Aug. 8, 1995

[30] Foreign Application Priority Data

Aug. 12, 1994 [JP] Japan .................................. 6-190845
Apr. 27, 1995 [JP] Japan .................................. 7-104368

[51] Int. Cl.$^6$ .............................. G02B 3/00; G02B 3/08
[52] U.S. Cl. .......................... 359/651; 359/649; 359/650; 359/742
[58] Field of Search ............................. 359/742, 649, 359/650, 651

[56] References Cited

U.S. PATENT DOCUMENTS

| | | | |
|---|---|---|---|
| 4,756,604 | 7/1988 | Nakatsuka et al. | 359/742 |
| 4,936,657 | 6/1990 | Tejima et al. | 359/742 |
| 5,162,844 | 11/1992 | Ueda | 359/742 |
| 5,170,207 | 12/1992 | Tezuka et al. | 359/742 |
| 5,260,831 | 11/1993 | Suzuki et al. | 359/742 |
| 5,268,790 | 12/1993 | Chen | 359/742 |
| 5,390,048 | 2/1995 | Miyatake et al. | 359/651 |

FOREIGN PATENT DOCUMENTS 2-40607  2/1990  Japan .

Primary Examiner—Georgia Y. Epps
Assistant Examiner—Evelyn A. Lester
Attorney, Agent, or Firm—Greenblum & Bernstein P.L.C.

[57] ABSTRACT

A projection lens assembly having an imaging lens group, including a first lens group having a positive refractive power, a second lens group having a positive refractive power, and a Fresnel lens group having a positive refractive power and at least one Fresnel lens surface, in this order from the enlargement side. The projection lens assembly satisfies the relationships $1.4<f_1/f<2.8$, and $1.5<f_2/f<6.0$. In these relationships, f represents the focal length of the whole lens system, $f_1$ the focal length of the first lens group, and $f_2$ the focal length of the second lens group.

16 Claims, 25 Drawing Sheets

PROJECTION LENS ASSEMBLY AND PROJECTOR

BACKGROUND OF THE INVENTION

1. Field of the Invention

The present invention relates to a projection lens assembly, for example, for enlarging a projection, which has an F No (f-number) of approximately 1:4-1:4.8, and a half field angle of around 40°, and in which a good performance can be obtained in a wide variable power range. The present invention also relates to a projector using such a projection lens.

2. Description of Related Art

To project a picture of a large size, it is known that one must project a small image of modulating elements on to a screen in an enlarged scale. In this projection system, separate B (blue), G (green) and R (red) images are combined by a color combining prism or the like, as disclosed, for example, in the Japanese Unexamined Patent Publication (Kokai) No. 2-40607.

However, the recent developments in the field of machining technology, regarding liquid crystal (of which an image modulating element is made), has enabled the provision of a color image, of high resolution, using just one liquid crystal modulating element. Consequently, no space is required for accommodating the color combining prism, as disclosed in JPP '067 mentioned above. Nevertheless, there is still a need for an increase in the angle of view, a decrease in the size, and a reduction in the manufacturing cost, for a projector.

Moreover, it is preferable that illuminating light is collimated light, in view of the dependency of a liquid crystal upon angle. However, it is necessary to use a large diameter lens in order to receive the collimated light, which is transmitted through the liquid crystal. To this end, it is widely known, to use a condenser lens to thereby realize a small image forming lens system. A condenser lens for a super wide angle lens has a strong power, and accordingly must be made of a Fresnel lens, from the viewpoint of space and optical performance.

SUMMARY OF THE INVENTION

It is the object of the present invention to provide an inexpensive and simple wide angle projection lens assembly, whose half angle of view (half field angle, ω) is approximately 40° (ω≈40°) i.e., and which was fewer components, whereby aberrations can be effectively corrected in a wide variable power range.

To achieve the object mentioned above according to the present invention, there is provided a projection lens assembly comprising: an imaging lens group including a first lens group having a positive refractive power, a second lens group having a positive refractive power, and a Fresnel lens group having a positive refractive power and at least one Fresnel lens surface, in this order from the enlargement side (magnifying side), wherein said projection lens meets the following formulae (1) and (2):

$$1.4 < f_1/f < 2.8, \text{ and} \quad (1)$$

$$1.5 < f_2/f < 6.0 \quad (2)$$

wherein f represents the focal length of the whole lens system, $f_1$ represents the focal length of the first lens group, and $f_2$ represents the focal length of the second lens group.

"The enlargement side" is the side of the projection of the lens system, opposite the object side to be projected (reduction side) i.e.,.

The second lens group can include of three lens elements, i.e., a II-1 lens element having a positive refractive power, a II-2 lens element having a negative refractive power, and a II-3 lens element having a positive refractive power, from the enlargement side. In the alternative, the second lens group can include two lens elements, i.e., a II-1 lens element having a positive refractive power, and a II-2 lens element having a negative refractive power, from the enlargement side. In both cases, it is preferable to meet the following formulae (3) and (4):

$$-1.0 < f/r_{21} < 0.5, \text{ and} \quad (3)$$

$$v_2 < 30 \quad (4)$$

wherein $r_{21}$ represents the radius of curvature of the lens surface of the II-1 lens element on the enlargement side, and $v_2$ represents the Abbe number of the II-2 lens element.

According to another aspect of the present invention, a projection lens is provided, comprising an imaging lens group having a positive refractive power, and a Fresnel lens group having a positive refractive power and at least one Fresnel lens surface, in this order from the enlargement side. The surface of the Fresnel lens group having the strongest refractive power is the Fresnel lens surface provided on the reduction side of the lens surface, and meets the following formulae (5) and (6):

$$50° < \theta < 70°, \text{ and} \quad (5)$$

$$0.2 < f_b/f < 0.6 \quad (6)$$

wherein

θ represents the angle defined between the optical axis and the line normal to the Fresnel lens surface at the portion of the Fresnel lens surface furthest from the optical axis, and $f_b$ represents the distance between the surface of the Fresnel lens group having the strongest refractive power and the conjugate plane on the reduction side.

Preferably, the imaging lens group includes of a first lens group having a positive refractive power, and a second lens group having a positive refractive power. Provision is made for a diaphragm provided between the first and second lens groups to restrict a bundle of light beams. Preferably, the lens surface of the Fresnel lens group on the enlargement side has a weaker refractive power than that of the lens surface on the reduction side. Also, the lens surface, of the Fresnel lens group, on the enlargement side is preferably made of an aspherical surface.

For example, the first lens group can include two lenses, i.e., a I-1 a meniscus lens whose convex surface is oriented toward the enlargement side and which has a positive refractive power, and a I-2 lens element of a positive refractive power provided with a convex surface on the enlargement side, in this order from the enlargement side. Alternatively, the first lens group can consist of three lens elements, i.e., a I-1 lens element group made of cemented positive and negative lenses, and a I-2 lens element of a positive refractive power having, from the enlargement side, a convex surface on the enlargement side. In both cases, it is preferable to meet the following formulae (7) and (8):

$$0.8 < r_{11}/r_{12} < 1.2, \text{ and} \quad (7)$$

$$0.1 < d_1/f < 0.25 \quad (8)$$

wherein $r_{11}$ represents the radius of curvature of the lens surface of the I-1 lens element on the enlargement side, $r_{12}$ represents the radius of curvature of the lens surface of the I-2 lens element on the reduction side, and $d_1$ represents the whole length of the first lens group.

In another alternative, it is possible to comprise the first lens group of one meniscus lens having a positive refractive power, and a convex surface on the enlargement side which meets the following formulae (9) and (10):

$$0.3 < r_1/f < 1.0, \text{ and} \quad (9)$$

$$0.2 < d_{12}/f < 0.4 \quad (10)$$

wherein $r_1$ represents the radius of curvature of the lens surface of the meniscus lens on the enlargement side, $d_{12}$ represents the spatial distance between the first lens group and the second lens group.

When the first lens group consists of a single lens, the single lens is preferably provided with at least one aspherical surface to improve performance.

The projection lens assembly of the present invention can be applied to a projector that includes a transparent liquid crystal panel on the reduction side, which lies in a plane conjugate with a screen on the enlargement side, wherein substantially parallel light beams incident upon the transparent liquid crystal panel project onto the screen through the Fresnel lens group and the imaging lens group.

In the projector, the Fresnel lens group and the imaging lens group preferably move relative to the transparent liquid crystal panel, so that light beams transmitted through the transparent type liquid crystal panel and gathered by the Fresnel lens group, are always be incident upon an entrance pupil of the imaging lens group at any projection distance.

According to a further aspect of the present invention, a projector is provided comprising a light source; a transparent liquid crystal panel; a Fresnel lens group having a positive refractive power and at least one Fresnel lens surface; an imaging lens group, including a first lens group having a positive refractive power and a second lens group having a positive refractive power; and a screen on which light beams emitted from the light source, transmitted through the transparent liquid crystal panel; and gathered by the Fresnel lens group are projected. The Fresnel lens and the imaging lens of the projector meets the following formulae (1) and (2):

$$1.4 < f_1/f < 2.8, \text{ and} \quad (1)$$

$$1.5 < f_2/f < 6.0 \quad (2)$$

wherein f represents the focal length of the whole lens system of the Fresnel lens and the imaging lens, $f_1$ represents the focal length of the first lens group, $f_2$ represents the focal length of the second lens group.

The present disclosure relates to subject matter contained in the Japanese patent application Nos. 06-190845 (filed on Aug. 12, 1994) and 07-104368 (filed on Apr. 27, 1995) which are expressly incorporated herein by reference in their entireties.

BRIEF DESCRIPTION OF THE DRAWINGS

The present invention will be discussed below in detail, with reference to the accompanying drawings, in which.

DESCRIPTION OF THE PREFERRED EMBODIMENT

Figure 32:
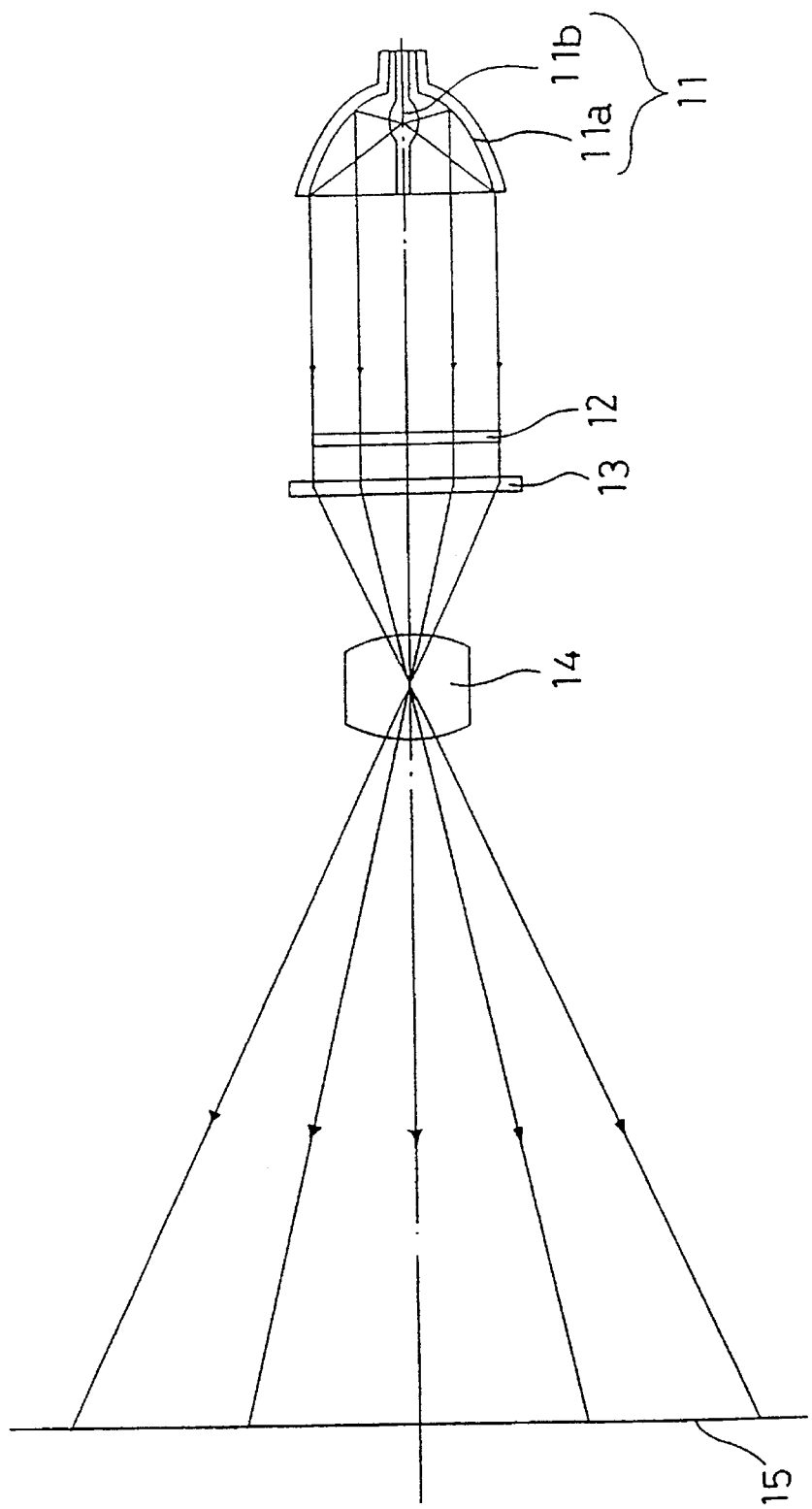
FIG. 32 is a conceptual view of a liquid crystal projector, to which a projection lens, according to the present invention, is applied.

FIG. 32 shows the whole structure of a liquid crystal projector to which a projection lens assembly, according to the present invention, is applied.

Substantially parallel light beams emitted from an illuminating light source 11 are transmitted through a color liquid crystal panel 12; condensed by a Fresnel condenser lens (referred to as a Fresnel lens) 13; and made incident upon a group of image forming lenses (referred to as an imaging lens group) 14. The imaging lens group 14, projects an image of the color liquid crystal panel 12 onto a screen 15. The illuminating light source 11 includes a parabolic mirror 11a, and a light emitter 11b which is located at the focal point of the parabolic mirror 11a. Light emitted from the light emitter 11b is reflected by the parabolic mirror 11a to be collimated light. In FIG. 32, the color liquid crystal panel 12 is made of a single plate. It is widely known to combine images of R, G and B color liquid crystal panels in a color liquid crystal projector. In such a known color liquid crystal projector, the optical system shown in FIG. 32 is applied to each liquid crystal panel.

Figure 33:
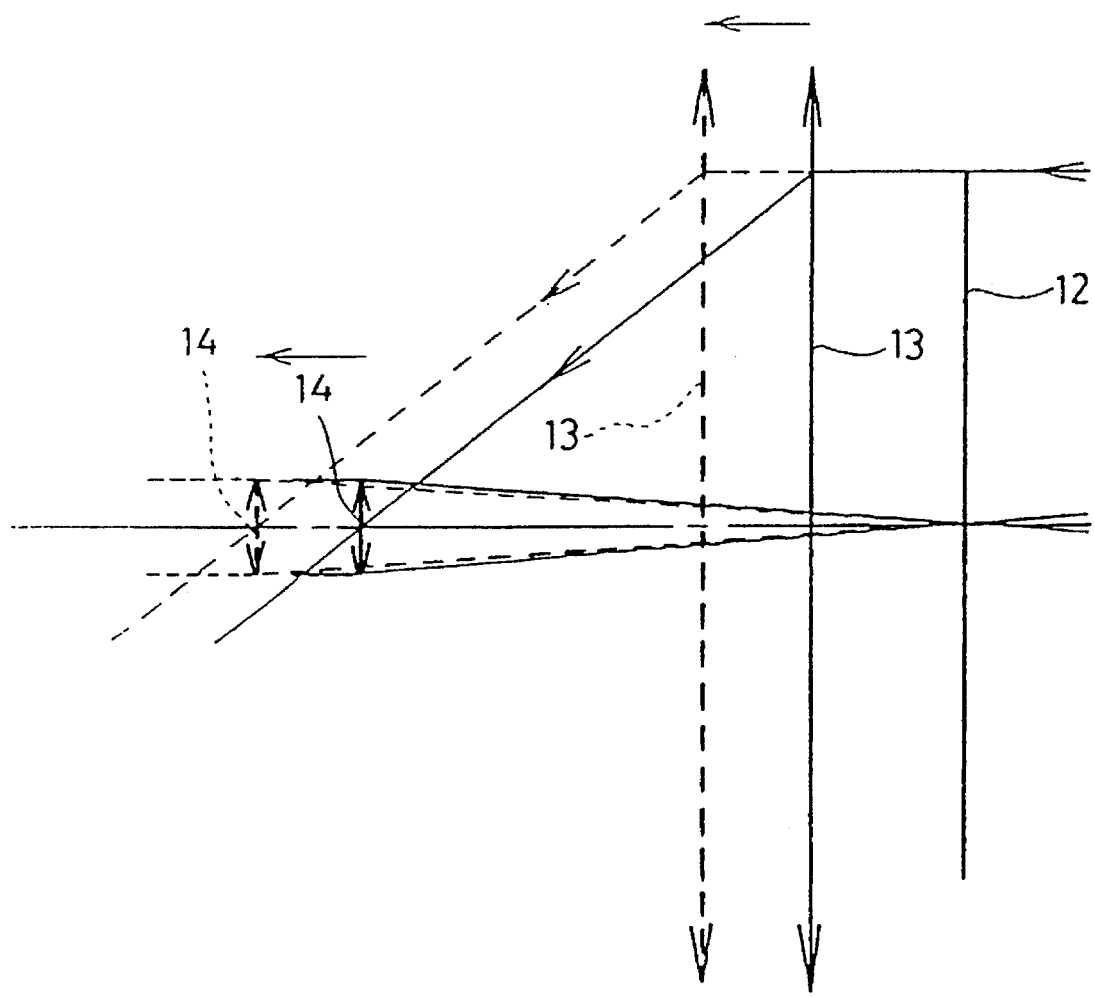
FIG. 33 is an explanatory view of the focusing device, of the projection lens, in the liquid crystal projector shown in FIG. 32.

FIG. 33 shows the principle of the focus adjustment in the liquid crystal projector. The focus adjusting method and apparatus shown in FIG. 33 have been proposed in a prior patent application, filed in the name of the present assignees. Parallel light beams, incident upon and transmitted through the color liquid crystal panel 12, are condensed by the Fresnel lens 13 and projected onto the screen 15 through the imaging lens group 14. In FIG. 33, the solid lines represent: the Fresnel lens 13, the imaging lens group 14, the light passing through the entrance pupil of the imaging lens group 14, at the longest projection distance (maximum projective magnification, i.e., the projected image size of ∞); and the phantom lines represent those at the shortest projection distance (minimum projective magnification, i.e., the projected image size of 10"), respectively.

Specifically, in FIG. 33, the Fresnel lens 13 and the imaging lens group 14 are moved toward the screen 15 by the substantially same displacement as the projection distance changes from the longest distance to the shortest distance. The displacements of the Fresnel lens 13 and the imaging lens group 14 are selected such that light (principal ray), incident upon and transmitted through the color liquid crystal panel 12, passes through the entrance pupil of the imaging lens group 14 at any magnification. In other words, the Fresnel lens 13 and the imaging lens group 14 are moved to constitute a substantially telecentric optical system, with respect to the color liquid crystal panel 12, at any magnification. According to such a movement of the Fresnel lens 13 and the imaging lens group 14, only the light incident upon the color liquid crystal panel 12 at right angles, project onto the screen 15. Thus, there is no decrease in the contrast of the color liquid crystal panel 12. Note that the Fresnel lens 13 and the imaging lens group 14 are made of positive lenses.

A projection lens assembly, according to the present invention, is applied, for example, to a liquid crystal projector as constructed above. In particular, the present invention can be advantageously applied to a projector in which the half angle of view, of the imaging lens group 14, is around 40°; and the projective magnification (on the enlargement side) varies within a range of approximately 4× to 20×.

The projection lens is comprised of three lens groups, i.e., an imaging lens group, made of a first lens group having a positive refractive power and a second lens group having a positive refractive power; and a Fresnel lens group (third lens group), having a positive refractive power and at least one Fresnel lens surface, in this order from the enlargement side. A diaphragm is disposed between the first and second lens groups. The projection lens assembly, according to the present invention, satisfies the requirements defined by the formulae (1) and (2) mentioned above.

Formula (1) specifies the positive power of the first lens group to correct the spherical aberration and the curvature of the field in a balanced state. If the ratio defined in the formula (1) is below the lower limit, the power of the first lens group is so strong that the image surface considerably varies, particularly at a close distance, and hence, the variable power range which can be is restricted. Conversely, if ratio in the formula (1) is above the upper limit, the power of the first lens group is too weak to correct the spherical aberration. Moreover, an over-correction of the curvature of the field tends to occur.

The formula (2) defines the positive power of the second lens group to correct various aberrations caused mainly in the third lens group in a balanced state. If the ratio defined in the formula (2) is above the upper limit, the power of the second lens group is so strong that the radius of curvature of each lens surface is too small; hence the comatic aberration is worsened. Conversely, if the ratio in the formula (2) is above the upper limit, the power of the second lens group is too weak to restrict an occurrence of astigmatism and distortion. Moreover, it is difficult to make the second lens group small.

The formula (3) defines the shape of the lens surface (first lens surface) of the second lens group on the magnification side. In the projection lens according to the present invention, the Fresnel lens surface, having a strong positive refractive power, is provided between the second lens group and the surface conjugate therewith on the reduction side, to establish a telecentric optical system, as mentioned above. The formula (3) refers to the requirement to correct the astigmatism and the distortion caused by the Fresnel lens surface. If the radius of curvature of the first lens surface of the second lens group satisfies formula (3), then astigmatism and the distortion can be corrected. If the value of the ratio is below the lower limit, it is difficult to correct the aspheric aberration and the curvature of the field in a balanced state. If the ratio is above the upper limit, the coma is worsened at the peripheral portion of the image surface.

Formula (4) defines the Abbe number of the negative lens of the second lens group, to correct the chromatic aberration. If the Abbe number is larger than the upper limit of the formula (4), then it is difficult to restrict the lateral chromatic aberration, particularly at the peripheral portion of the image surface.

Figure 31:
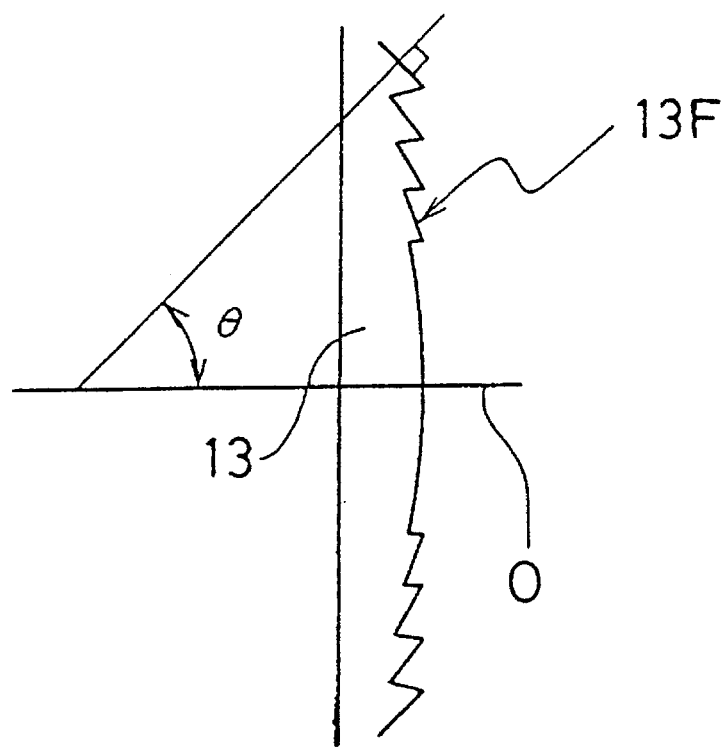
FIG. 31 is an explanatory view of an angle θ, defined between an optical axis and a line normal to a Fresnel lens surface.

The formula (5) relates to the shape of the Fresnel lens surface of the third lens group, that has the strongest positive refractive power. FIG. 31 shows the angle θ, defined as the difference between the optical axis O and the normal line to the Fresnel lens surface 13F of the Fresnel lens 13; if the angle θ is smaller than the lower limit, the refractive power at the peripheral portion of the Fresnel lens surface is too weak to provide desired telecentric optical characteristics. Conversely, if the angle θ is larger than the upper limit, the cut edges of the prisms, formed on the Fresnel lens surface, are so sharp that there is a large loss (shape loss) in the amount of light. Furthermore, it is difficult to machine prisms having such sharp edges.

Formula (6) relates to a back focal distance, i.e., a distance between a surface on the reduction side of the Fresnel lens and a conjugate plane of the lens system of the reduction side. If the Fresnel lens surface is closer to the conjugate surface than the lower limit in the formula (6), the aberration caused by the Fresnel lens surface can be restricted; however, a moire pattern occurs due to a regular pattern of the liquid crystal panel located in the conjugate plane and a pitch of the Fresnel lens surface, or an enlarged Fresnel pattern is projected. If the back focal length is longer than the upper limit, it is difficult to restrict the transverse chromatic aberration.

The formula (7) relates to the shape of the I-1 lens element group of the first lens group having positive refractive power, located on the enlargement side, when the first lens group is comprised of a plurality of lens elements. The I-1 lens element group is made of a meniscus lens or cemented lenses. If the positive refractive power of the I-1 lens element group is stronger than the lower limit, an overcorrection of the spherical aberration takes place, and the astigmatism is increased. Conversely, if the refractive power exceeds the upper limit, an under spherical aberration occurs and the coma is worsened.

The formula (8) specifies the ratio between the total length of the first lens group and the total length of the whole lens system, when the first lens group is comprised of a plurality of lenses. If the ratio is smaller than the lower limit, it is difficult to correct the astigmatism and the coma in a balanced state. Conversely, if the ratio exceeds the upper limit, that is, if the total length of the first lens group is too long, the aberrations can be effectively corrected, but it is difficult to make the lens small.

The formula (9) specifies the shape of the lens when the first lens group is made of one meniscus lens. If the ratio (radius of curvature) is smaller than the lower limit, an under spherical aberration occurs. Conversely, if the radius of curvature is larger than the upper limit in the formula (9), the comatic flare is undesirably enhanced at the peripheral portion of the lens.

The formula (10) specifies the spatial distance between the first lens group and the second lens group when the first lens group is made of one meniscus lens. In the projection lens assembly, according to the present invention, there is always a space between the first lens group and the second lens group. In the case that the first lens group is made of a single lens, when the spatial distance between the first and second lens groups is selected to be a value within the range defined by the formula (10), the aberrations can be effectively corrected. If the spatial distance is so small that the ratio is smaller than the lower limit, the power of the lens groups increases, and consequently, it is difficult to restrict the variation of the aberration within a wide variable power range. Conversely, if the spatial distance is so large that the ratio is larger than the upper limit, the aberrations can be corrected, but the length and size of the lens group increase, contrary to a realization of a small and inexpensive lens system.

It is preferable that the lens system meets the requirements defined by the following formulae (11) and (12) to obtain a better optical performance;

$$0.3 < f_3/f_{12} < 1.5 \qquad (11)$$

$$n_1 < 1.65 \qquad (12)$$

wherein $f_3$ designates the focal length of the third lens group, $f_{12}$ the resultant focal length of the first and second lens groups, and $n_1$ the refractive index of the II-1 lens element of the second lens group, respectively.

The formula (11) specifies the ratio of the resultant power of the first and second lens groups, and the power of the third lens group. If the lens system satisfies the relationship defined by the formula (11), a good telecentric optical property can be obtained by the third lens group, without worsening the aberrations. If the value of the formula (11) is smaller than the lower limit, the power of the third lens group is too strong to restrict the spherical aberration and the comatic aberration. If the ratio is larger than the upper limit, the power of, particularly, the second lens group is so strong that the radius of curvature of each lens surface is small, and hence, it is difficult to restrict the astigmatism.

The formula (12) defines the refractive index of the positive lens of the second lens group, located on the enlargement side to effectively correct the curvature of the field. If the refractive index of the positive lens exceeds the upper limit, it is difficult to obtain a flat image surface. Moreover, a glass material having a high refractive index is expensive, resulting in an increase in the manufacturing cost of the projector.

Figure 1:
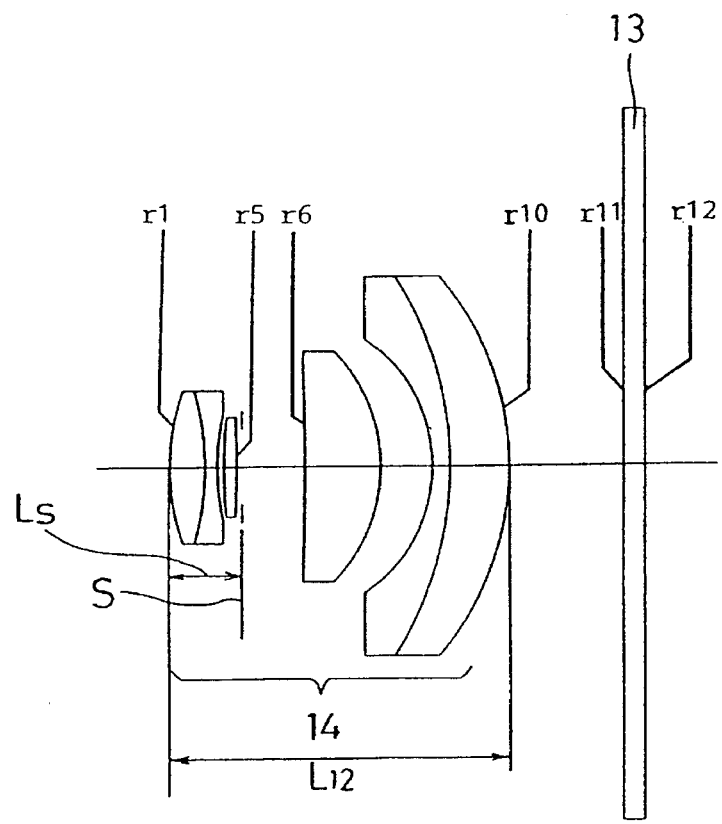
FIG. 1 is a schematic view showing an optical lens arrangement of a projection lens, according to the first embodiment of the present invention.

There is a diaphragm S, provided between the first and second lens groups, which constitute the imaging lens group, to restrict a bundle of light. If the first lens group is made of a single lens, assuming that the distance between the surface of the first lens group on the enlargement side and the diaphragm S is Ls, and the distance between the surface of the first lens group on the enlargement side and the surface of the second lens group on the reduction side is L12, respectively, as shown in FIG. 1, the lens system preferably satisfies the following relationship:

$$L_s/L_{12} < 0.5 \tag{13}$$

If the first lens group is made of a plurality of lenses, the formula (13) is replaced with the following formula (13'):

$$L_s/L_{12} < 0.35 \tag{13'}$$

Figure 34:
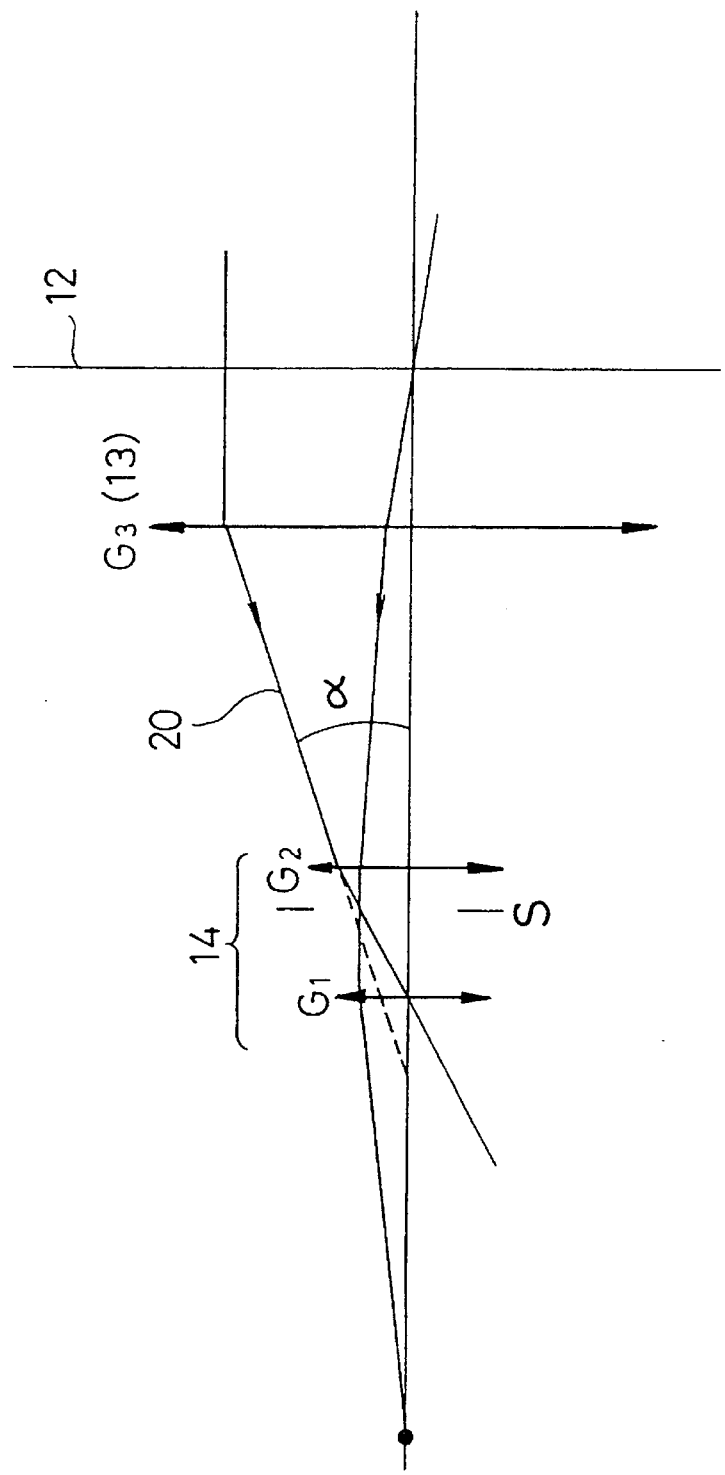
FIG. 34 is an explanatory view showing a position of the diaphragm in a projection lens, according to the present invention; and, FIG. 35 is an explanatory view of a pupil of a group of image forming lenses, according to the present invention.

The formulae (13) and (13') specify the requirement on the position of the diaphragm. If the diaphragm is located as close to the first lens group $G_1$ as possible, (provided that the ratio is smaller than the upper limit), the pupil of the imaging lens group 14, formed by the first and second lens groups $G_1$ and $G_2$, can be located on the enlargement side(magnifying side). Consequently, as seen in FIG. 34, it is possible to reduce the inclination angle α, of the principal ray 20, at the maximum view angle position, between the second lens group $G_2$ and the third lens group $G_3$ (Fresnel lens 13). Consequently, the Fresnel angle of the Fresnel lens 13, belonging to the third lens group $G_3$, can be made small.

Figure 35:
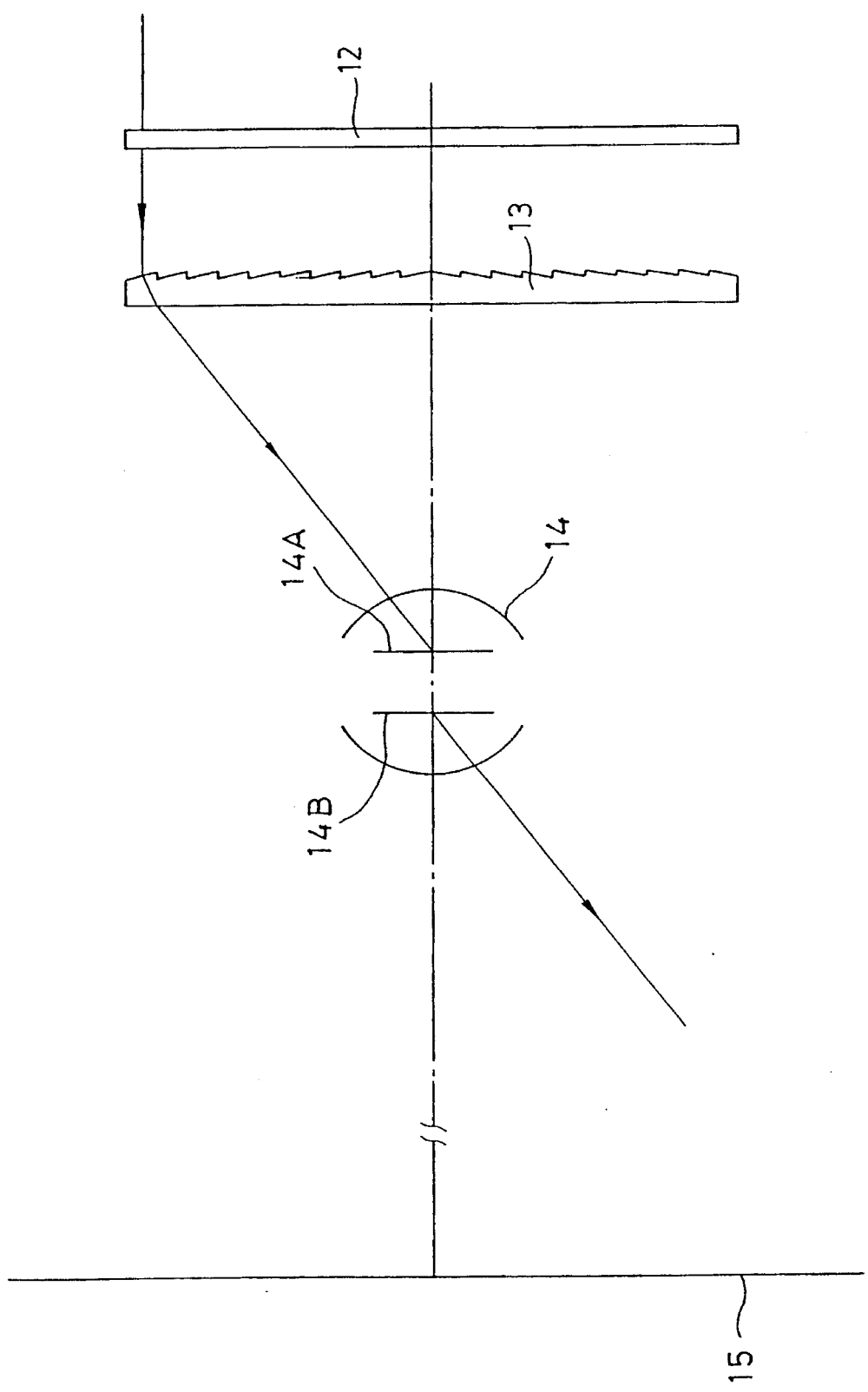

FIG. 35 shows the positions of the entrance pupil 14A and the exit pupil 14B, of the imaging lens group 14. Namely, light condensed by the Fresnel lens 13 is incident upon the entrance pupil 14A of the imaging lens group 14. The Fresnel lens 13 and the imaging lens group 14 are moved, with respect to the liquid crystal panel 12, so that the light condensed by the Fresnel lens 13 is always incident upon the entrance pupil 14A, regardless of the projection distance.

Several numerical examples (embodiments) of an optical system according to the present invention will be discussed below.

In the drawings and tables below, "$F_{NO}$" designates the f-number; "$2\omega$," the angle of view on the enlargement side; "R" the radius of curvature of each lens surface; "D" the lens thickness or the distance between the lenses; "$n_d$" the refractive index of the d-line of each lens; "$\nu_d$" the Abbe number of each lens; "SA" the spherical aberration; "SC" the sine condition; "d-line", "g-line" and "C-line" the spherical aberration, the axial chromatic aberration, and the transverse (lateral) chromatic aberration, at their respective wavelengths; and "S" and "M" of the astigmatism of the sagittal ray and meridional ray, respectively.

The shape of the aspheric surface can be generally expressed as follows:

$$X = CY^2/\{1+[1-(1+K)C^2Y^2]^{1/2}\} + a_4Y^4 + A_6Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex (1/r),

K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

EMBODIMENT 1

Figure 2:
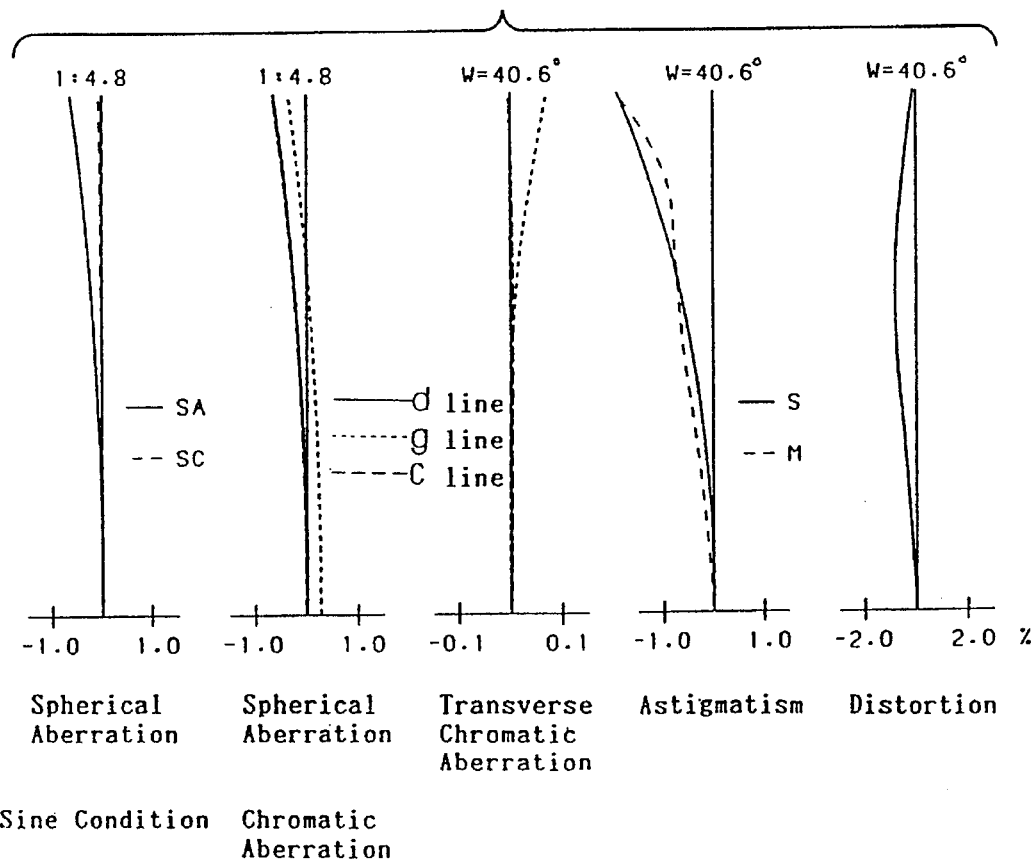
FIG. 2 shows diagrams of various aberrations of the lens system in FIG. 1, on the reduction side, when the projection magnification on the enlargement side is 20x.
Figure 3:
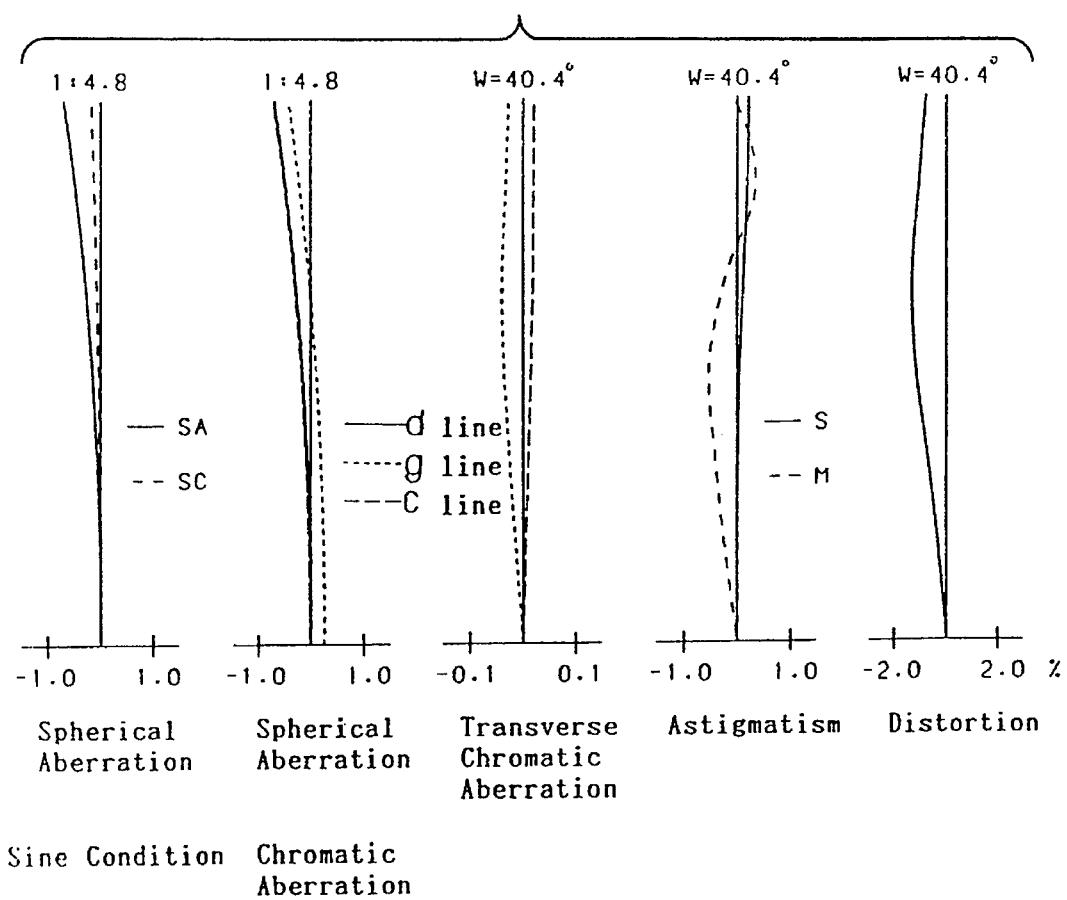
FIG. 3 shows diagrams of various aberrations of the lens system in FIG. 1, on the reduction side, when the projective magnification on the enlargement side is 4x.

FIGS. 1 through 3 show the first embodiment of a projector, according to the present invention. FIG. 1 shows a lens arrangement; FIG. 2 shows diagrams of aberrations on the reduction side when the magnification on the enlargement side is 20x; and FIG. 3 shows diagrams of aberrations on the reduction side when the magnification on the enlargement side is 4x, respectively. Numerical data of the lens system of the first embodiment is shown in Table 1 below. In this embodiment, the first and second lens groups are each made of three lens elements. The I-1 and I-2 lens elements of the first lens group are cemented to each other, and the II-2 and II-3 lens elements of the second lens group are cemented to each other.

TABLE 1

| | $F_{NO}$ = 1:4.8 | | | |
| | f = 35 mm | | | |
| | 2ω = 81.2° ~ 80.8° | | | |
| Surface No. | R | D | $n_d$ | $\nu_d$ |
|---|---|---|---|---|
| 1 | 19.361 | 3.20 | 1.71299 | 53.9 |
| 2 | −23.876 | 1.10 | 1.80610 | 40.9 |
| 3 | 20.005 | 0.64 | — | — |
| 4 | 44.935 | 1.16 | 1.60342 | 38.0 |
| 5 | −104.450 | 0.50 | — | — |
| STOP | ∞ | 5.74 | — | — |
| 6 | −243.066 | 6.88 | 1.48749 | 70.2 |
| 7 | −14.574 | 4.76 | — | — |
| 8 | −13.411 | 1.62 | 1.80518 | 25.4 |
| 9 | −30.507 | 5.48 | 1.51633 | 64.1 |
| 10 | −25.342 | 10.61 | — | — |
| 11 | ∞ | 1.97 | 1.49176 | 57.4 |
| 12* * | −17.270 | — | — | — |
| Aspherical data: | | | | |

NO. 12: $K = -1.02$, $A4 = -0.44464 \times 10^{-5}$, $A6 = 0.38486 \times 10^{-8}$, $A8 = -0.15493 \times 10^{-11}$

* *denotes aspherical fresnel surface

EMBODIMENT 2

Figure 4:
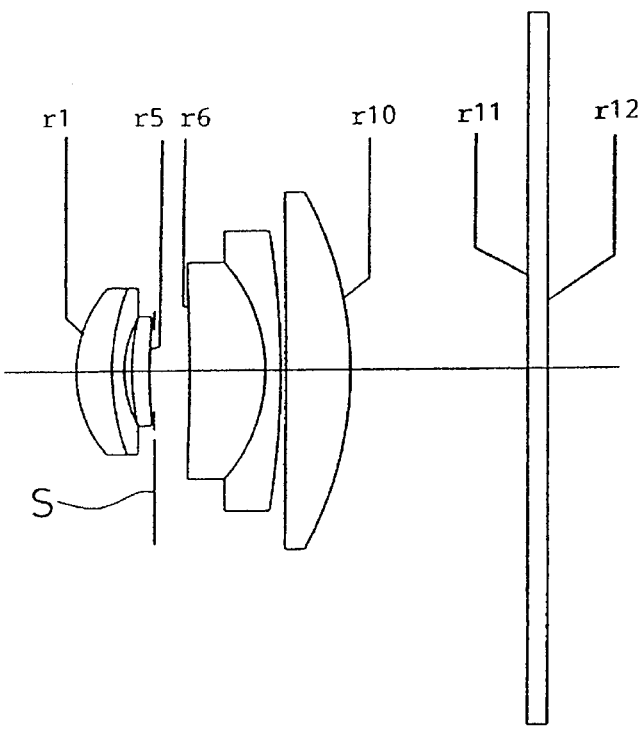
FIG. 4 is a schematic view showing an optical lens arrangement of a projection lens according to the second embodiment of the present invention.
Figure 5:
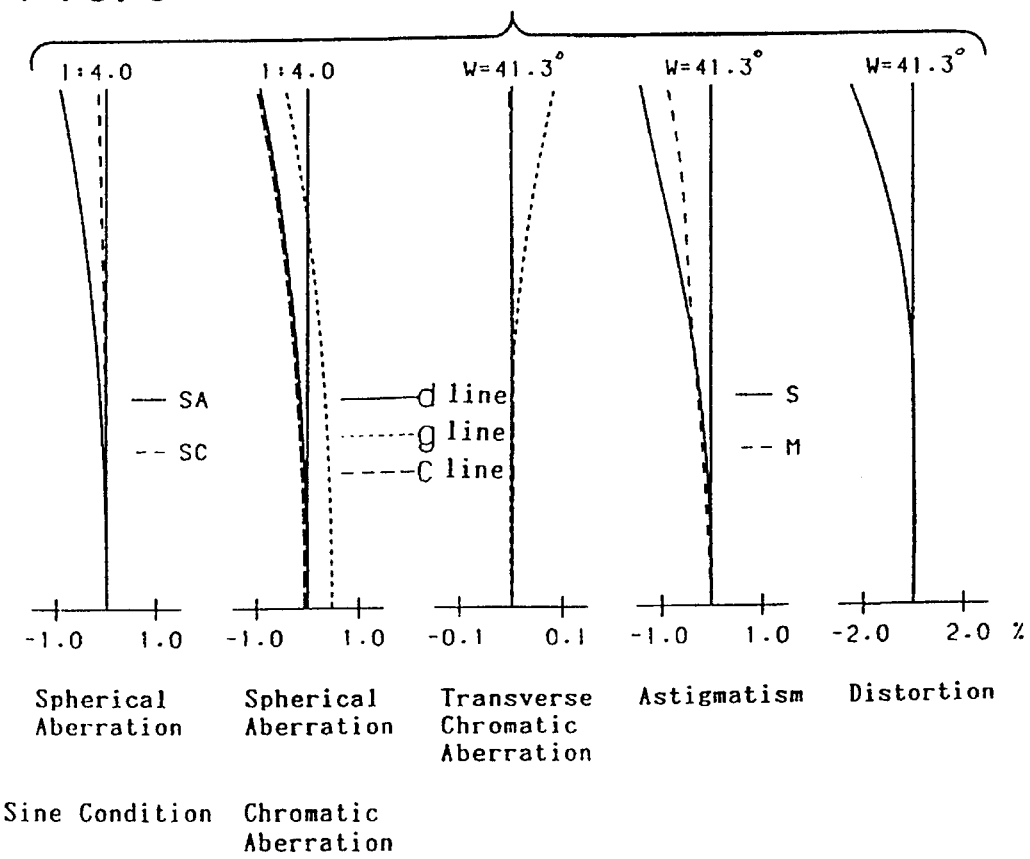
FIG. 5 shows diagrams of various aberrations of the lens system in FIG. 4, on the reduction side, when the projective magnification on the enlargement side is 20x.
Figure 6:
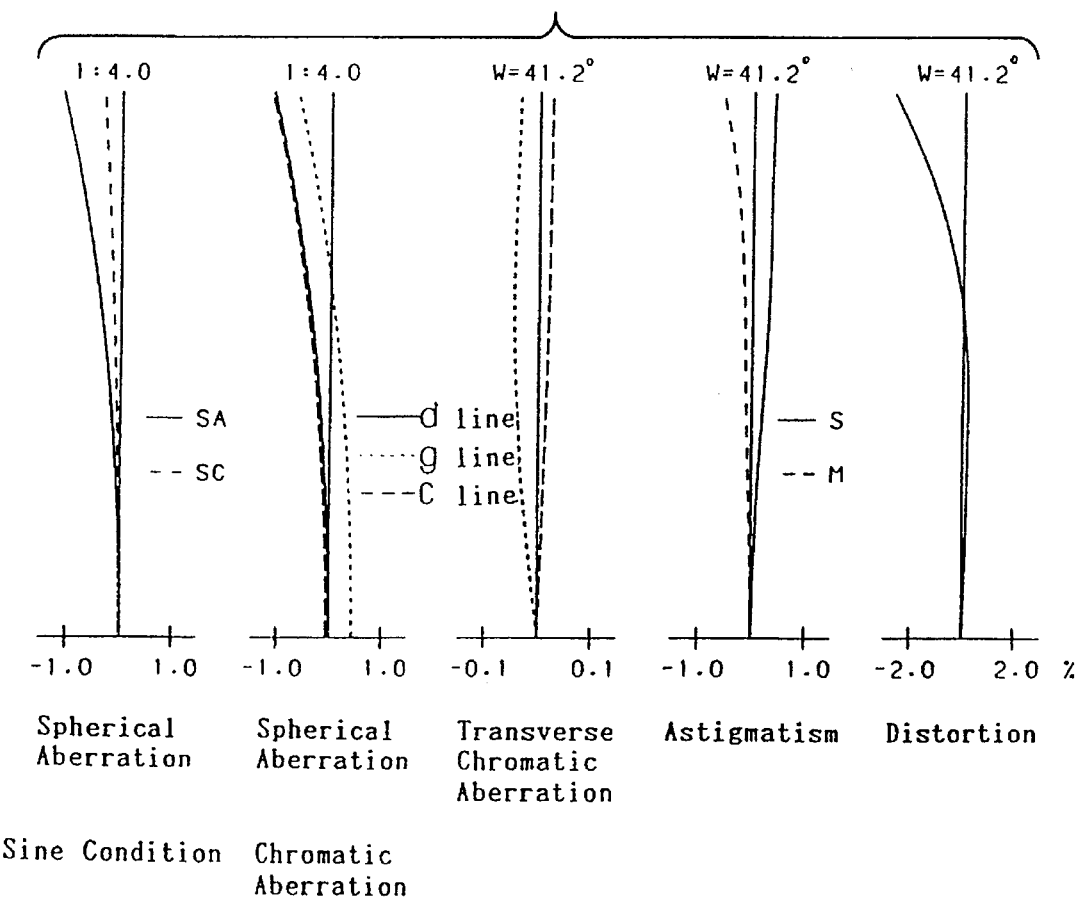
FIG. 6 shows diagrams of various aberrations of the lens system in FIG. 4, on the reduction side, when the projective magnification on the enlargement side is 4x.

FIGS. 4 through 6 show the second embodiment of a projector, according to the present invention. FIG. 4 shows a lens arrangement; FIG. 5 shows diagrams of aberrations on the reduction side when the magnification on the enlargement side is 20x; and FIG. 6 shows diagrams of aberrations on the reduction side when the magnification on the enlargement side is 4x, respectively. Numerical data of the lens system of the second embodiment is shown in Table 2 below. In this embodiment, the first and second lens groups are each made of three lens elements. The I-1 and I-2 lens elements of the first lens group are cemented to each other, and the II-2 and II-3 lens elements of the second lens group are cemented to each other.

TABLE 2

| | $F_{NO}$ = 1:4.0 | | | |
| | f = 35 mm | | | |
| | 2ω = 82.6° ~ 82.4° | | | |
| Surface NO. | R | D | $n_d$ | $\nu_d$ |
|---|---|---|---|---|
| 1 | 11.060 | 3.28 | 1.58913 | 61.2 |
| 2 | 19.328 | 1.16 | 1.60342 | 38.0 |
| 3 | 9.963 | 0.68 | — | — |
| 4 | 19.338 | 1.62 | 1.58913 | 61.2 |
| 5 | 45.022 | 0.48 | — | — |
| STOP | ∞ | 3.15 | — | — |
| 6 | −172.860 | 6.90 | 1.53172 | 48.9 |
| 7 | −14.169 | 1.45 | 1.78472 | 25.7 |
| 8 | −73.544 | 0.48 | — | — |
| 9 | −1277.170 | 6.05 | 1.51633 | 64.1 |
| 10 | −31.768 | 16.36 | — | — |
| 11 | ∞ | 1.93 | 1.49176 | 57.4 |
| 12 * * | −16.909 | — | — | — |

TABLE 2-continued $F_{NO} = 1:4.0$
$f = 35$ mm
$2\omega = 82.6° \sim 82.4°$

| Surface NO. | R | D | $n_d$ | $v_d$ |
|---|---|---|---|---|
| Aspherical data: | | | | |

NO. 12: $\quad K = -1.00, A4 = -0.35023 \times 10^{-6},$
$\qquad A6 = 0.89364 \times 10^{-10}, A8 = 0.21011 \times 10^{-12}$

* * denotes aspherical fresnel surface

EMBODIMENT 3

Figure 7:
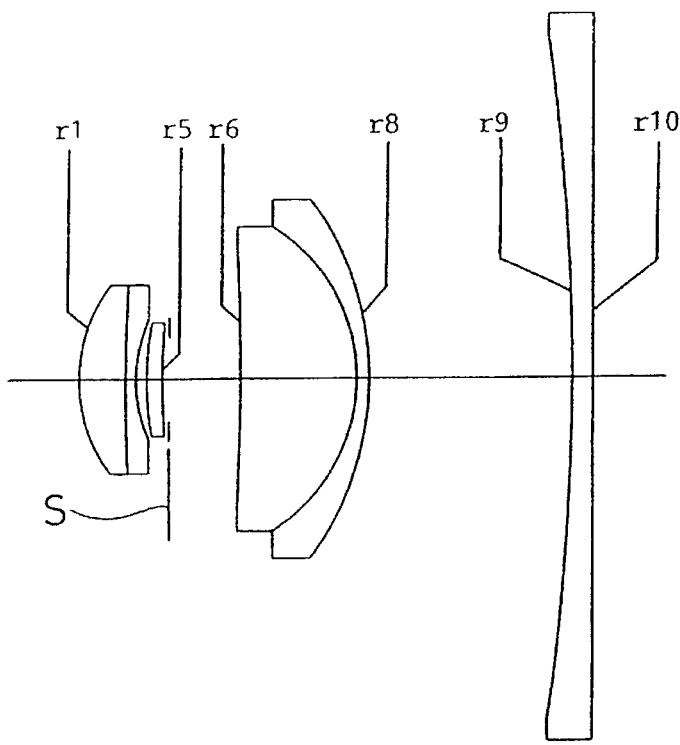
FIG. 7 is a schematic view showing an optical lens arrangement of a projection lens, according to the third embodiment of the present invention.
Figure 8:
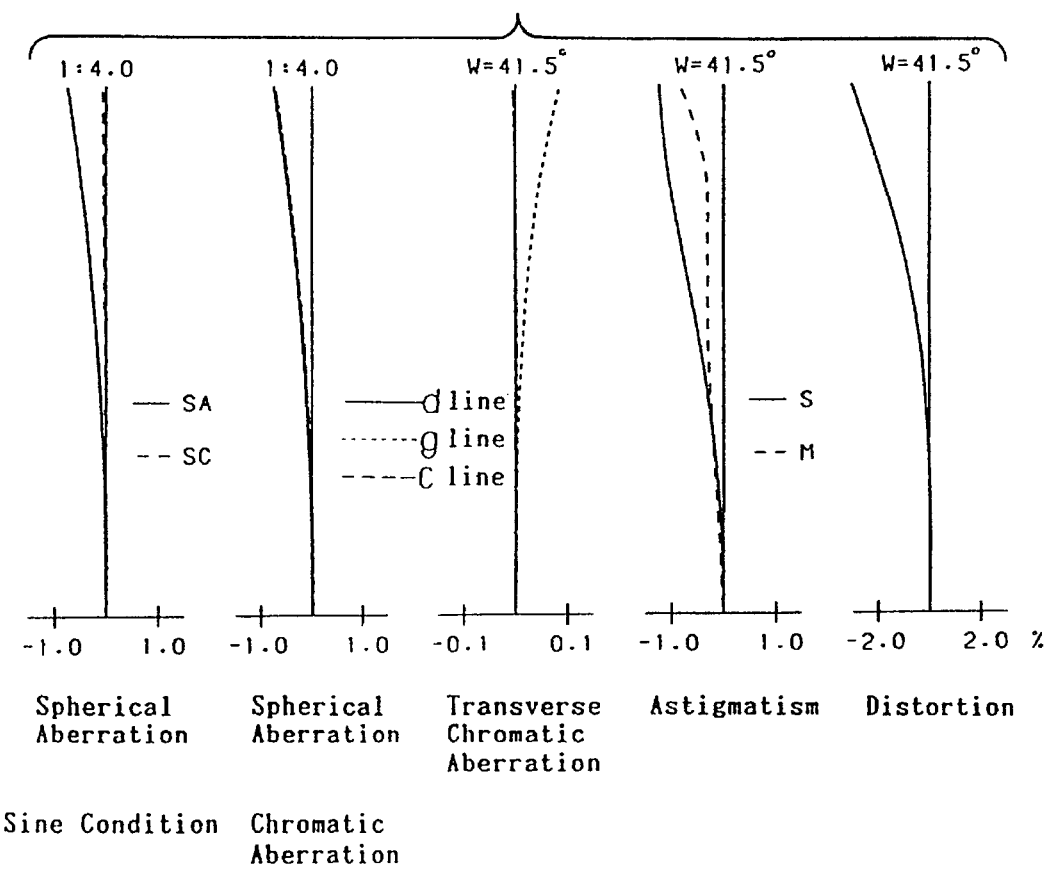
FIG. 8 shows diagrams of various aberrations of the lens system in FIG. 7, on the reduction side, when the projective magnification on the enlargement side is 20x.
Figure 9:
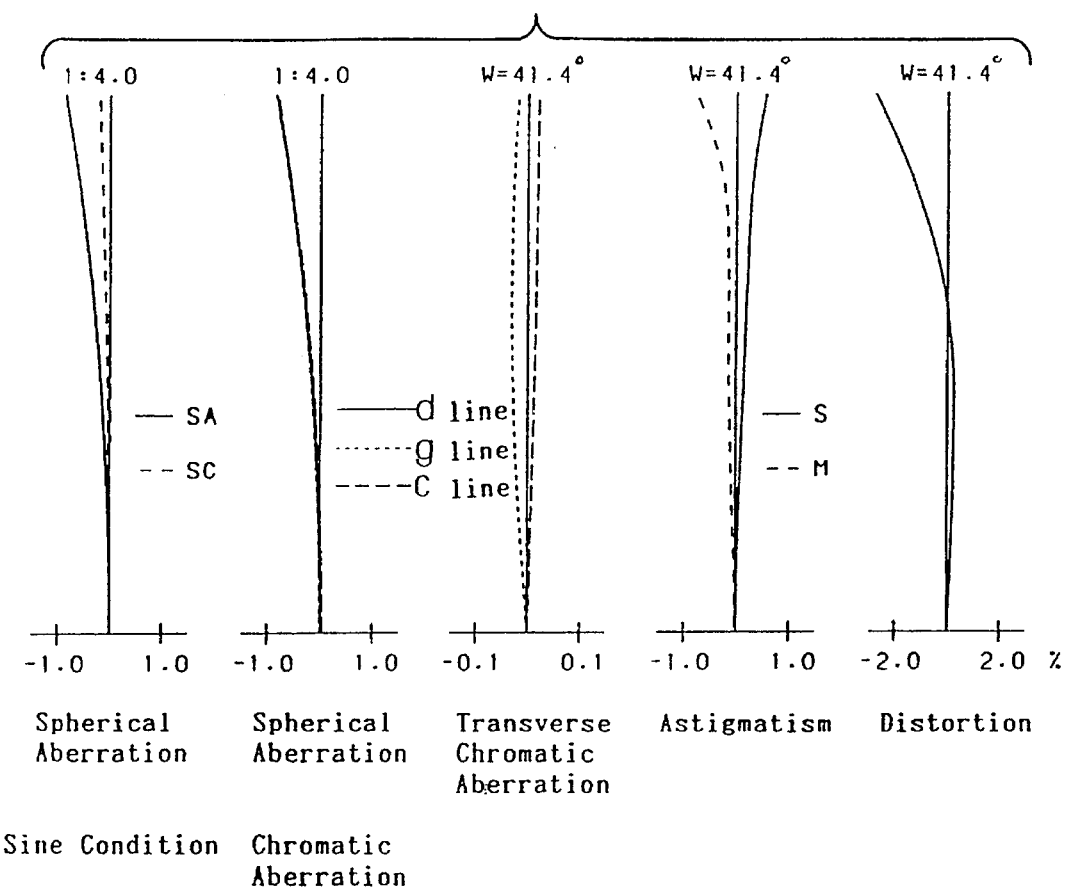
FIG. 9 shows diagrams of various aberrations of the lens system in FIG. 7, on the reduction side, when the projective magnification on the enlargement side is 4x.

FIGS. 7 through 9 show the third embodiment of a projector, according to the present invention. FIG. 7 shows a lens arrangement; FIG. 8 shows diagrams of aberrations on the reduction side when the magnification on the enlargement side is 20x; and FIG. 9 shows diagrams of aberrations on the reduction side when the magnification on the enlargement side is 4x, respectively. Numerical data of the lens system of the second embodiment is shown in Table 3 below. In this embodiment, the first lens group is made of three lens elements, and the second lens group is made of two lens elements. The I-1 and I-2 lens elements of the first lens group are cemented to each other, and the II-1 and II-2 lens elements of the second lens group are cemented to each other.

TABLE 3

$F_{NO} = 1:4.0$
$f = 35$ mm
$2\omega = 83° \sim 82.8°$

| Surface NO. | R | D | $n_d$ | $v_d$ |
|---|---|---|---|---|
| 1 | 13.319 | 4.28 | 1.51633 | 64.1 |
| 2 | 144.693 | 0.95 | 1.54072 | 47.2 |
| 3 | 12.510 | 0.98 | — | — |
| 4 | 26.272 | 1.44 | 1.76200 | 40.1 |
| 5 | 52.290 | 0.66 | — | — |
| STOP | ∞ | 6.42 | — | — |
| 6 | −214.623 | 10.46 | 1.58913 | 61.2 |
| 7 | −15.401 | 1.14 | 1.84666 | 23.8 |
| 8 | −25.719 | 18.21 | — | — |
| 9 * | −179.588 | 1.90 | 1.49176 | 57.4 |
| 10 * * | −16.786 | — | — | — |
| Aspherical data: | | | | |

NO. 9: $\quad K = -1.00, A4 = 0.58900 \times 10^{-6},$
$\qquad A6 = -0.37444 \times 10^{-9}, A8 = 0.0$
NO. 10: $\quad K = -1.00, A4 = 0.23236 \times 10^{-6},$
$\qquad A6 = -0.12297 \times 10^{-8}, A8 = 0.0$

* denotes aspherical surface
* * denotes aspherical fresnel surface

EMBODIMENT 4

Figure 10:
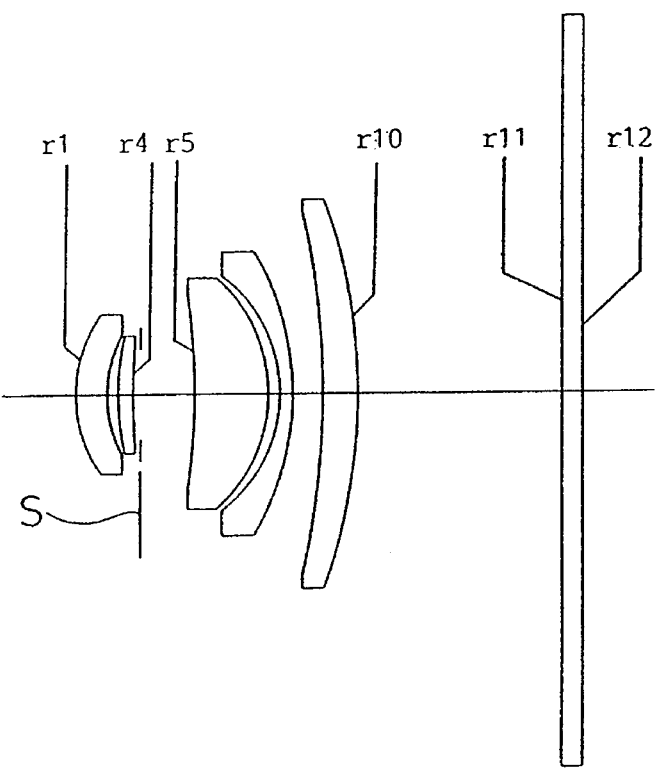
FIG. 10 is a schematic view showing an optical lens arrangement of a projection lens, according to the fourth embodiment of the present invention.
Figure 11:
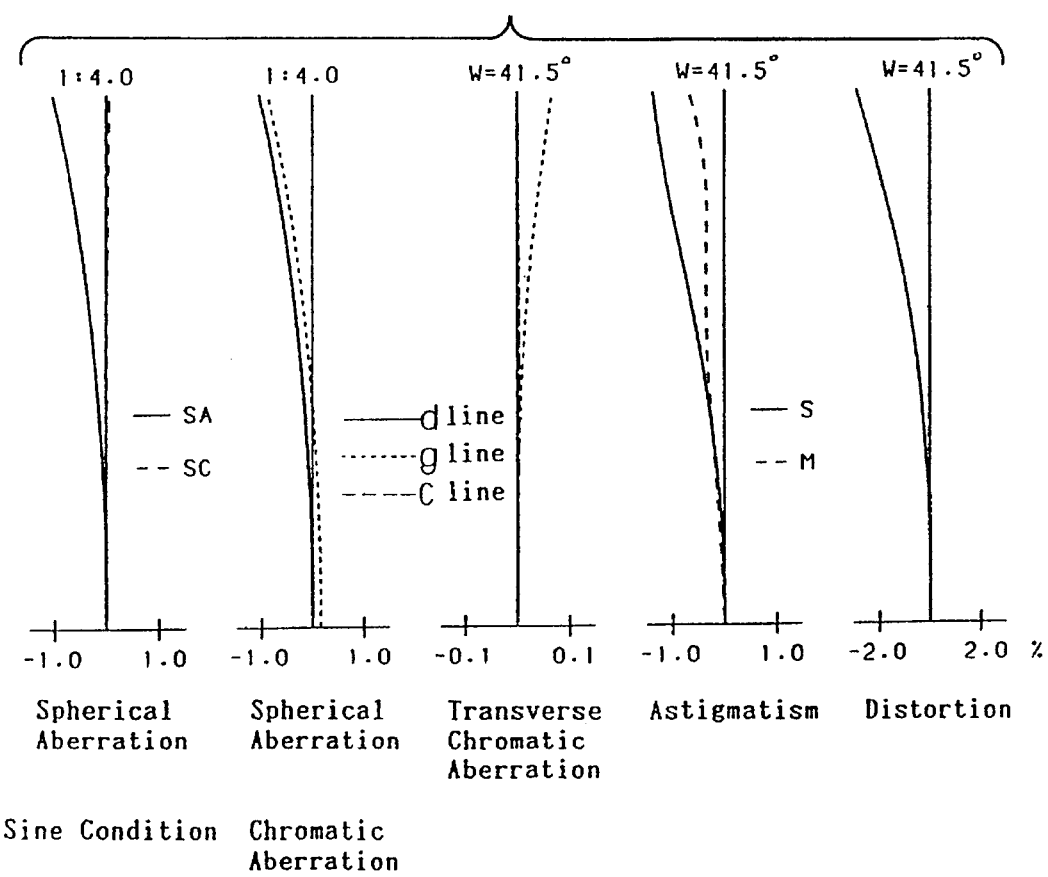
FIG. 11 shows diagrams of various aberrations of the lens system in FIG. 10, on the reduction side, when the projective magnification on the enlargement side is 20x.
Figure 12:
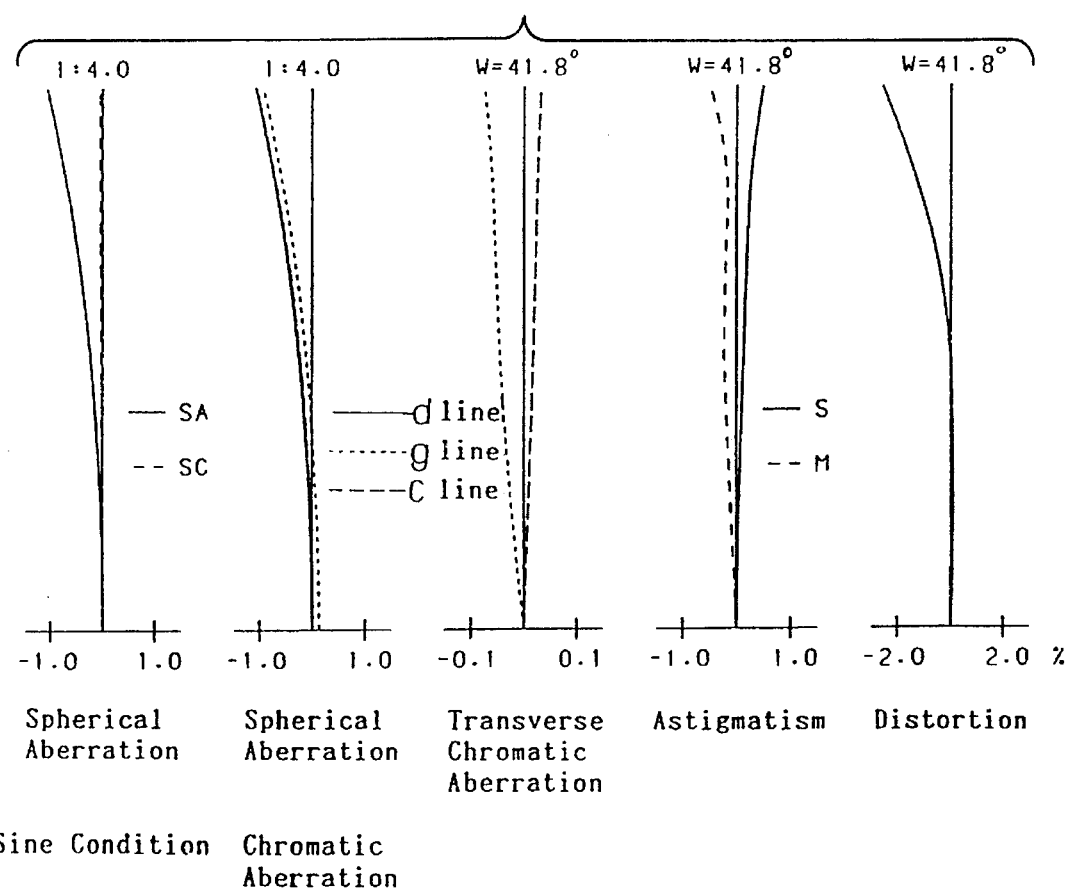
FIG. 12 shows diagrams of various aberrations of the lens system in FIG. 10, on the reduction side, when the projective magnification on the enlargement side is 4x.

FIGS. 10 through 12 show the fourth embodiment of a projector, according to the present invention. FIG. 10 shows lens arrangement; FIG. 11 shows diagrams of aberrations on the reduction side when the magnification on the enlargement side is 20x; and FIG. 12 shows diagrams of aberrations on the reduction side when the magnification on the enlargement side is 4x, respectively. Numerical data of the lens system of the second embodiment is shown in Table 4 below. In this embodiment, the first lens group is made of two lens elements, and the second lens group is made of three lens elements. There are no cemented lenses.

TABLE 4

$F_{NO} = 1:4.0$
$f = 35$ mm
$2\omega = 83° \sim 83.6°$

| Surface NO. | R | D | $n_d$ | $v_d$ |
|---|---|---|---|---|
| 1 | 11.511 | 2.86 | 1.48749 | 70.2 |
| 2 | 10.808 | 0.99 | — | — |
| 3 | 22.111 | 1.36 | 1.58913 | 61.2 |
| 4 | 47.473 | 0.70 | — | — |
| STOP | ∞ | 4.91 | — | — |
| 5 | −59.385 | 6.67 | 1.61271 | 58.7 |
| 6 | −13.086 | 1.04 | — | — |
| 7 | −12.525 | 1.17 | 1.84666 | 23.8 |
| 8 | −23.247 | 2.66 | — | — |
| 9 | −68.212 | 3.19 | 1.51633 | 64.1 |
| 10 | −47.649 | 18.32 | — | — |
| 11 | ∞ | 1.95 | 1.49176 | 57.4 |
| 12 * * | −17.419 | — | — | — |
| Aspherical data: | | | | |

NO. 12: $\quad K = -1.00, A4 = 0.67778 \times 10^{-5},$
$\qquad A6 = -0.70255 \times 10^{-9}, A8 = 0.11110 \times 10^{-12}$

* * denotes aspherical fresnel surface

EMBODIMENT 5

Figure 13:
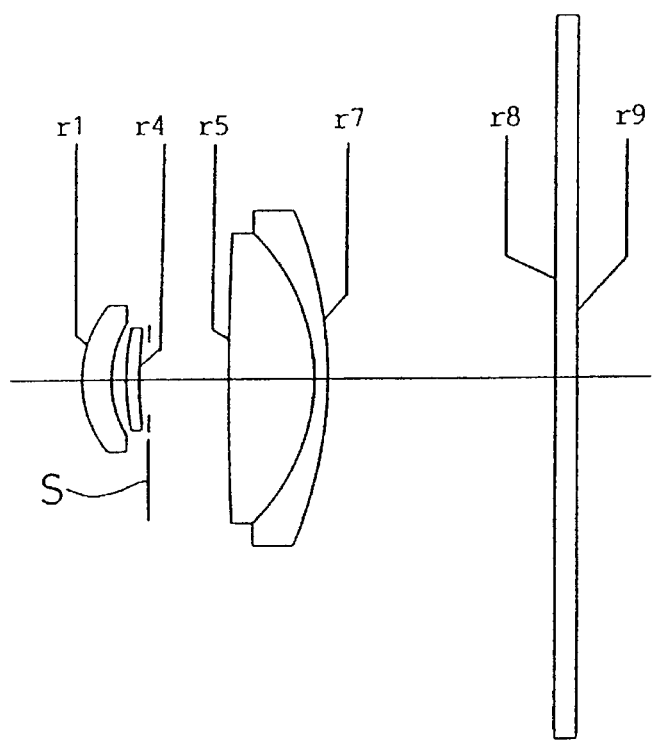
FIG. 13 is a schematic view showing an optical lens arrangement of a projection lens, according to the fifth embodiment of the present invention.
Figure 14:
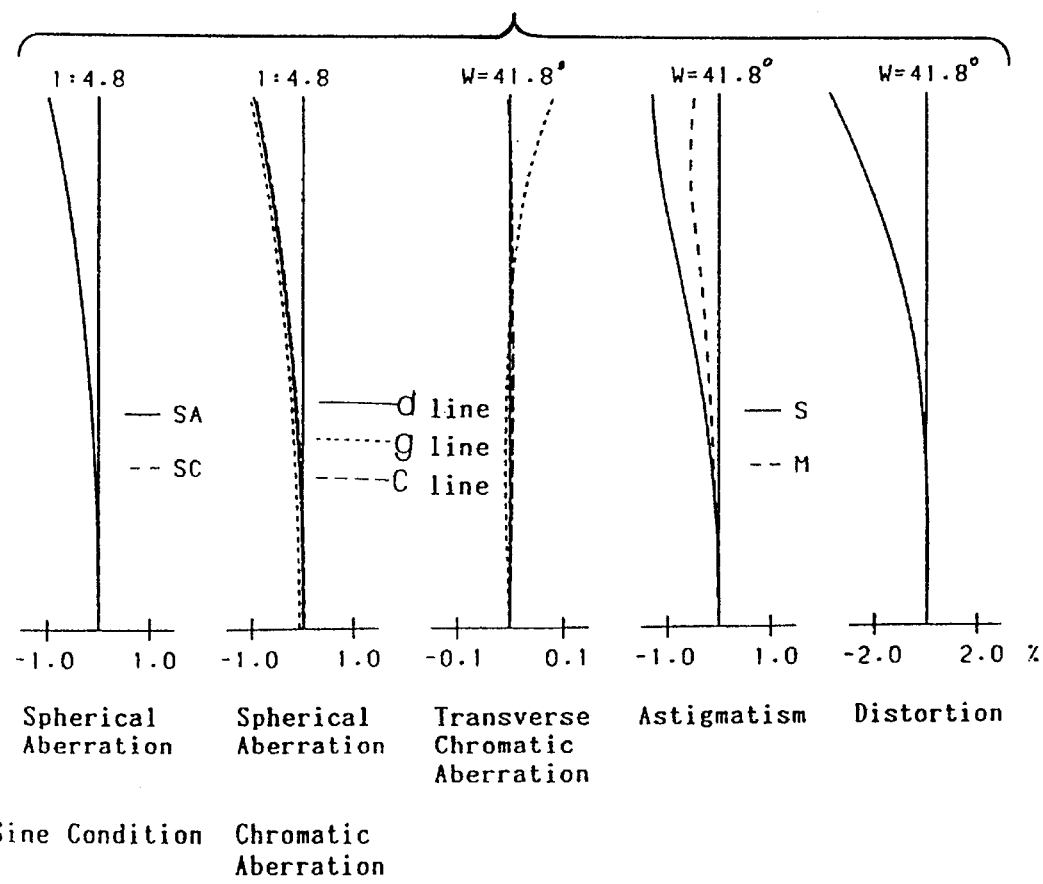
FIG. 14 shows diagrams of various aberrations of the lens system in FIG. 13, on the reduction side, when the projective magnification on the enlargement side is 20x.
Figure 15:
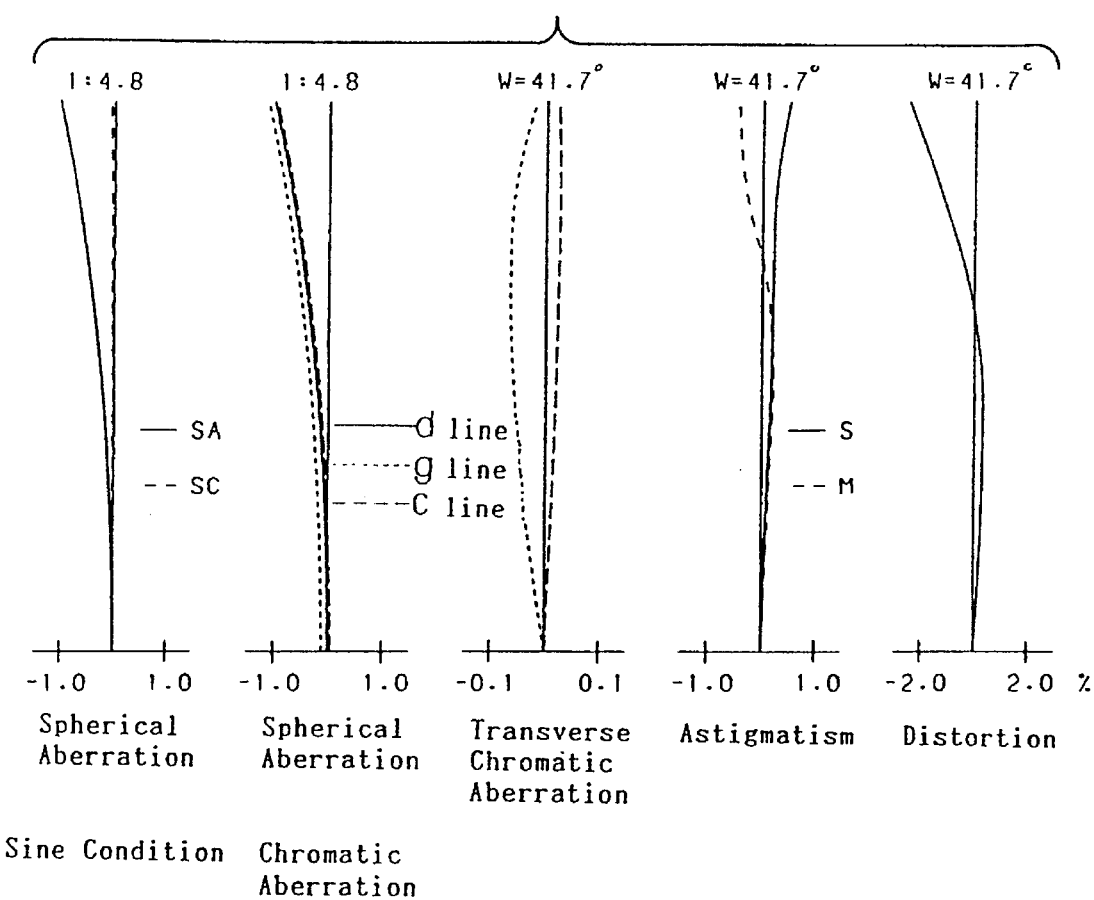
FIG. 15 shows diagrams of various aberrations of the lens system in FIG. 13, on the reduction side, when the projective magnification on the enlargement side is 4x.

FIGS. 13 through 15 show the fifth embodiment of a projector, according to the present invention. FIG. 13 shows a lens arrangement; FIG. 14 shows diagrams of aberrations on the reduction side when the magnification on the enlargement side is 20x; and FIG. 15 shows diagrams of aberrations on the reduction side when the magnification on the enlargement side is 4x, respectively. Numerical data of the lens system of the second embodiment is shown in Table 5 below. In this embodiment, the first and second lens groups are each made of two lens elements. The II-1 and II-2 lens elements of the second lens group are cemented to each other.

TABLE 5

$F_{NO} = 1:4.8$
$f = 35$ mm
$2\omega = 83.6° \sim 83.4°$

| Surface NO. | R | D | $n_d$ | $v_d$ |
|---|---|---|---|---|
| 1 | 9.939 | 2.67 | 1.51633 | 64.1 |
| 2 | 9.652 | 1.32 | — | — |
| 3 | 21.080 | 1.16 | 1.58913 | 61.2 |
| 4 | 31.527 | 0.88 | — | — |
| STOP | ∞ | 7.10 | — | — |
| 5 | 311.182 | 7.57 | 1.58913 | 61.2 |
| 6 | −17.465 | 1.16 | 1.78472 | 25.7 |
| 7 | −36.830 | 20.49 | — | — |
| 8 * * | 167.478 | 1.94 | 1.49176 | 57.4 |
| 9 * * | −18.779 | — | — | — |
| Aspherical data: | | | | |

NO. 8: $\quad K = -1.00, A4 = -0.20896 \times 10^{-6},$
$\qquad A6 = -0.54739 \times 10^{-9}, A8 = 0.0$
NO. 9: $\quad K = -1.00, A4 = -0.19932 \times 10^{-5},$
$\qquad A6 = -0.34538 \times 10^{-8}, A8 = 0.0$

* * denotes aspherical fresnel surface

EMBODIMENT 6

Figure 16:
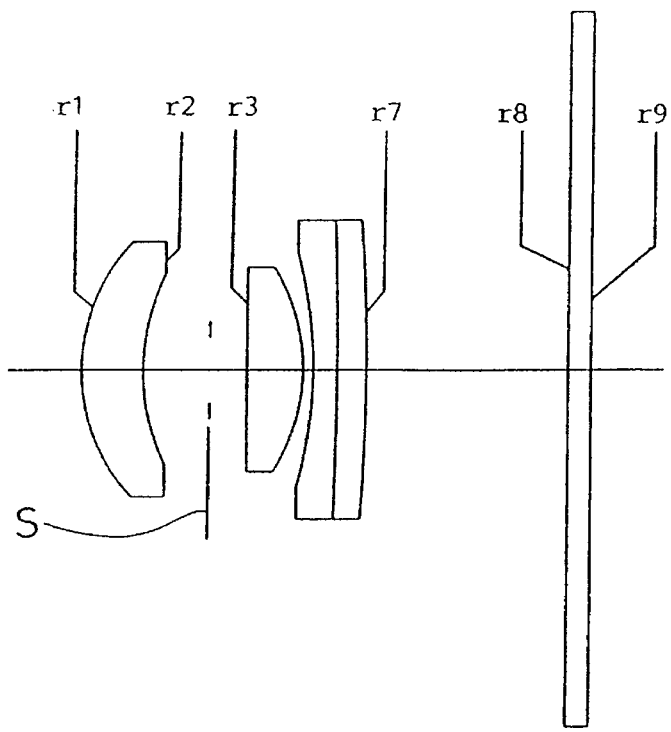
FIG. 16 is a schematic view showing an optical lens arrangement of a projection lens, according to the sixth embodiment of the present invention.
Figure 17:
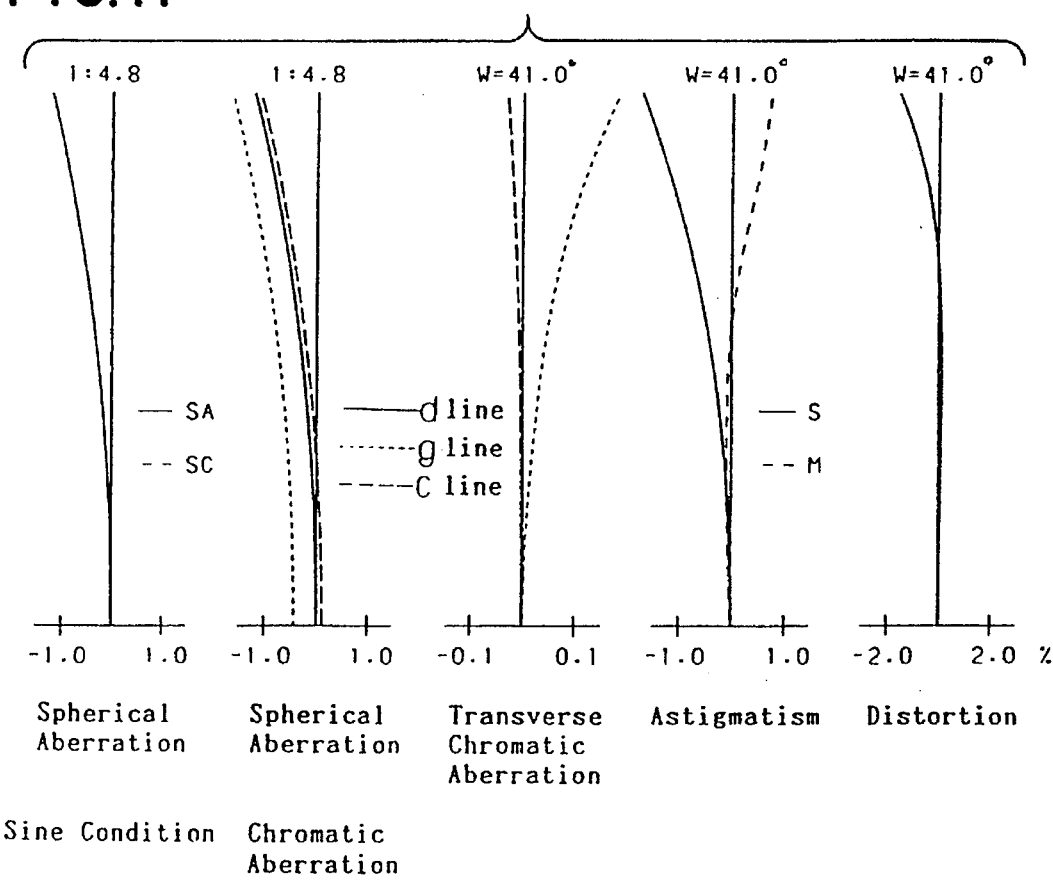
FIG. 17 shows diagrams of various aberrations of the lens system in FIG. 16, on the reduction side, when the projective magnification on the enlargement side is 20x.
Figure 18:
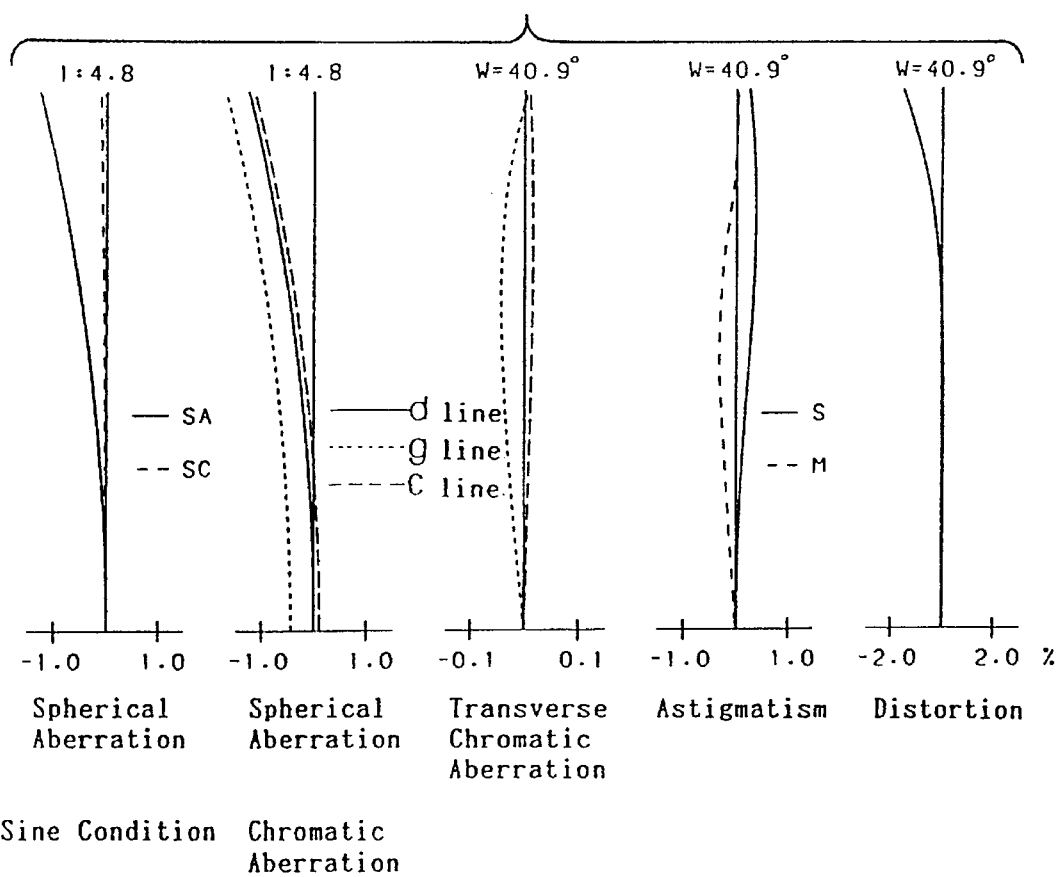
FIG. 18 shows diagrams of various aberrations of the lens system in FIG. 16, on the reduction side, when the projective magnification on the enlargement side is 4x.

FIGS. 16 through 18 show the sixth embodiment of a projector, according to the present invention. FIG. 16 shows a lens arrangement; FIG. 17 shows diagrams of aberrations on the reduction side when the magnification on the enlargement side is 20x; and FIG. 18 shows diagrams of aberrations on the reduction side when the magnification on the enlargement side is 4x, respectively. Numerical data of the lens system of the second embodiment is shown in Table 6 below. In this embodiment, the first lens group is made of a single lens element (i.e., a positive meniscus lens having a convex surface located on the enlargement side), and the second lens group is made of three lens elements. The II-2 and II-3 lens elements of the second lens group are cemented to each other.

TABLE 6

$F_{NO} = 1:4.8$
$f = 35$ mm
$2\omega = 82° \sim 81.8°$

| Surface NO. | R | D | $n_d$ | $v_d$ |
|---|---|---|---|---|
| 1 | 15.606 | 5.63 | 1.65128 | 38.3 |
| 2 | 18.409 | 6.02 | — | — |
| STOP | ∞ | 3.31 | — | — |
| 3 | 1474.638 | 5.04 | 1.51633 | 64.1 |
| 4 | −16.295 | 0.92 | — | — |
| 5 | −36.221 | 2.11 | 1.75520 | 27.5 |
| 6 | −327.288 | 2.64 | 1.51633 | 64.1 |
| 7 | −164.551 | 18.03 | — | — |
| 8 | ∞ | 2.11 | 1.49176 | 57.4 |
| 9 * * | −14.862 | — | — | — |
| Aspherical data: | | | | |
| NO. 9: | K = −1.00, A4 = −0.38647 × 10⁻⁵, | | | |
| | A6 = 0.15399 × 10⁻⁸, A8 = 0.76314 × 10⁻¹⁴ | | | |

* * denotes aspherical fresnel surface

EMBODIMENT 7

Figure 19:
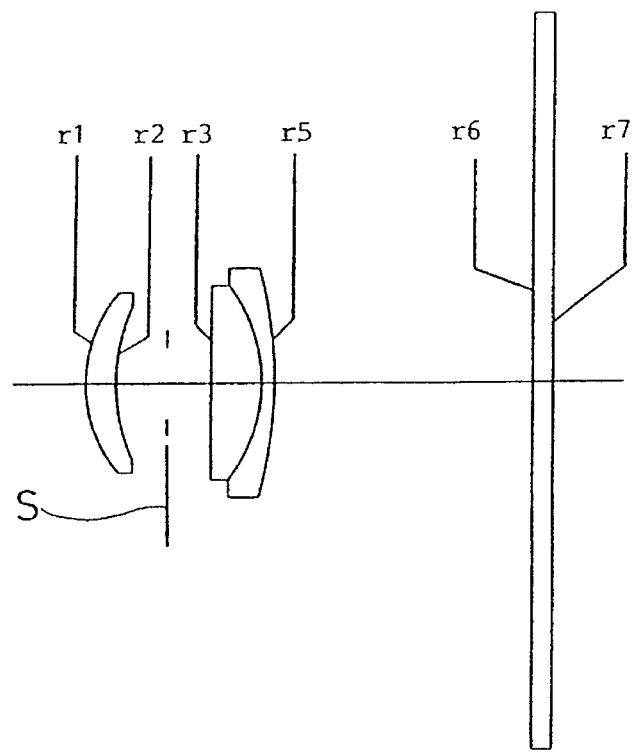
FIG. 19 is a schematic view showing an optical lens arrangement of a projection lens, according to the seventh embodiment of the present invention.
Figure 20:
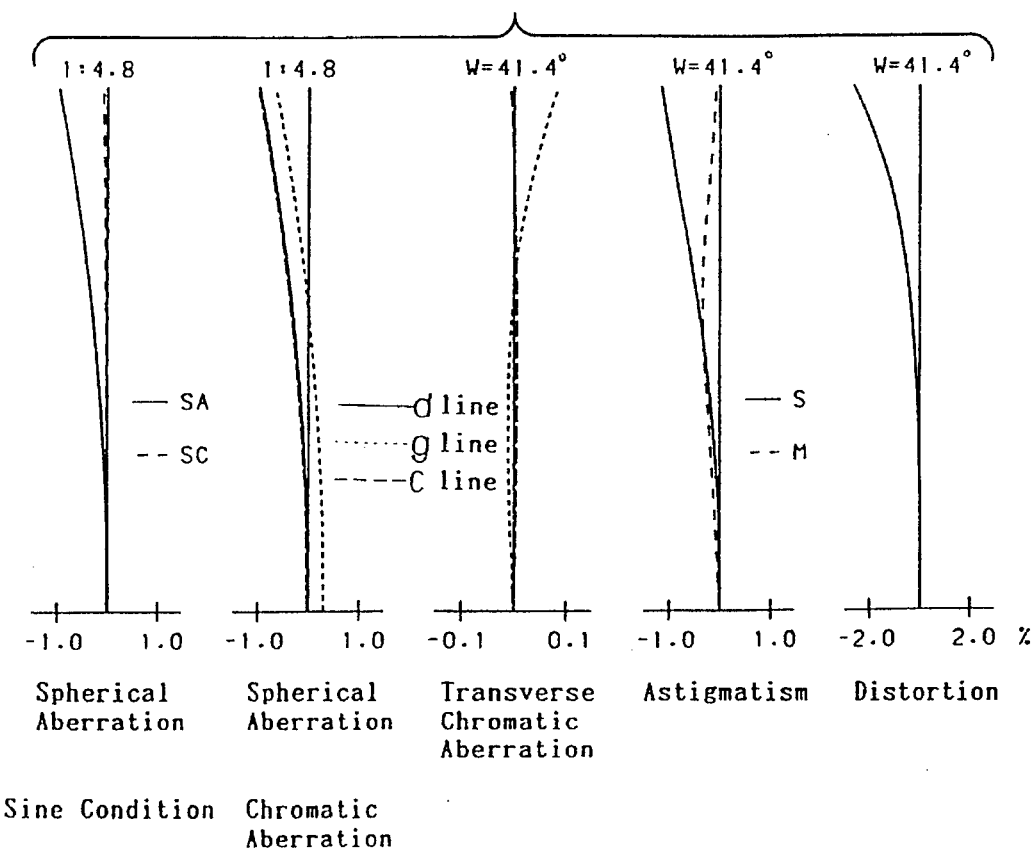
FIG. 20 shows diagrams of various aberrations of the lens system in FIG. 19, on the reduction side, when the projective magnification on the enlargement side is 20x.
Figure 21:
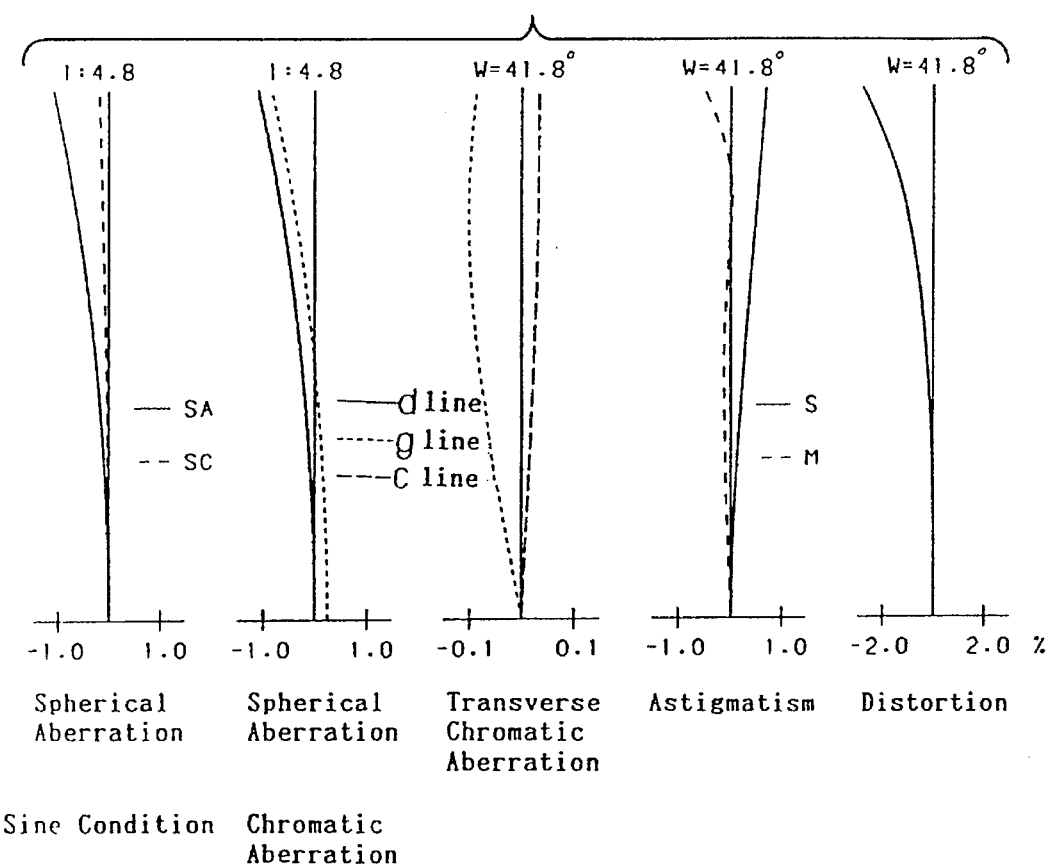
FIG. 21 shows diagrams of various aberrations of the lens system in FIG. 19, on the reduction side, when the projective magnification on the enlargement side is 4x.

FIGS. 19 through 21 show the seventh embodiment of a projector, according to the present invention. FIG. 19 shows a lens arrangement; FIG. 20 shows diagrams of aberrations on the reduction side when the magnification on the enlargement side is 20x; and FIG. 21 shows diagrams of aberrations on the reduction side when the magnification on the enlargement side is 4x, respectively. Numerical data of the lens system of the second embodiment is shown in Table 7 below. In this embodiment, the first lens group is made of a single lens element (i.e., a positive meniscus lens having a convex surface located on the enlargement side), and the second lens group is comprised of II-1 and II-2 lens elements which are cemented to each other.

TABLE 7

$F_{NO} = 1:4.8$
$f = 35$ mm
$2\omega = 82.8° \sim 83.6°$

| Surface NO. | R | D | $n_d$ | $v_d$ |
|---|---|---|---|---|
| 1 | 11.982 | 2.76 | 1.51633 | 64.1 |
| 2 | 15.790 | 4.66 | — | — |
| STOP | ∞ | 3.87 | — | — |
| 3 | 974.923 | 4.54 | 1.58913 | 61.2 |
| 4 | −13.860 | 1.15 | 1.78472 | 25.7 |
| 5 | −38.117 | 23.69 | — | — |
| 6 * * | 118.107 | 1.91 | 1.49176 | 57.4 |
| 7 * * | −17.385 | — | — | — |
| Aspherical data: | | | | |
| NO. 6: | K = −1.00, A4 = −0.19753 × 10⁻⁵, | | | |
| | A6 = 0.39755 × 10⁻⁹, A8 = 0.0 | | | |
| NO. 7: | K = −1.00, A4 = −0.47137 × 10⁻⁶, | | | |
| | A6 = −0.11233 × 10⁻⁹, A8 = 0.0 | | | |

* * denotes aspherical fresnel surface

EMBODIMENT 8

Figure 22:
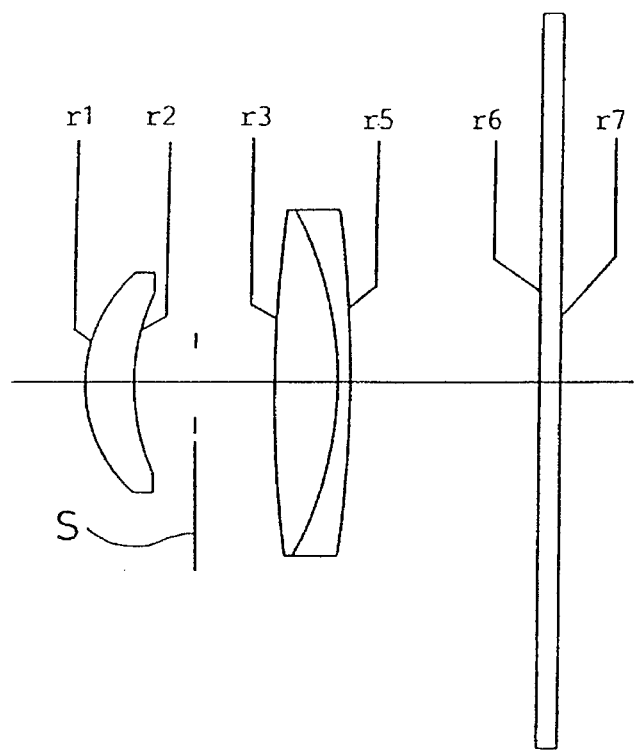
FIG. 22 is a schematic view showing an optical lens arrangement of a projection lens, according to the eighth embodiment of the present invention.
Figure 23:
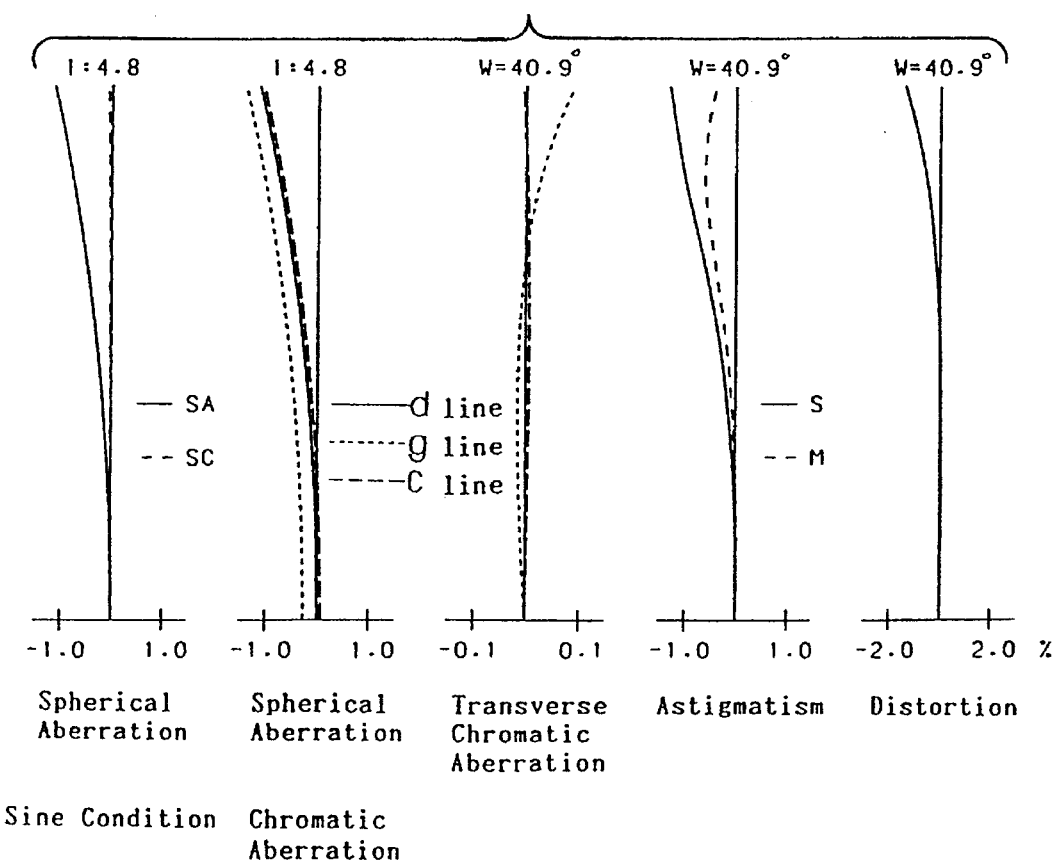
FIG. 23 shows diagrams of various aberrations of the lens system in FIG. 22, on the reduction side, when the projective magnification on the enlargement side is 20x.
Figure 24:
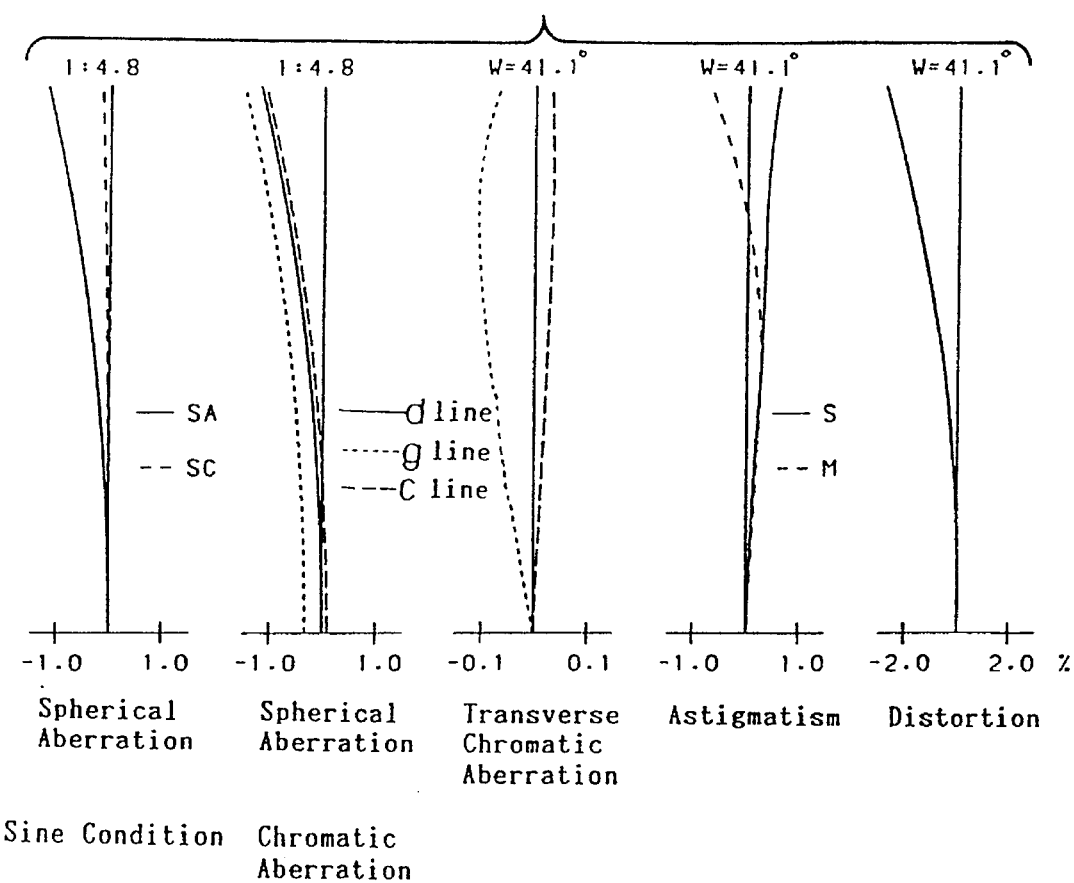
FIG. 24 shows diagrams of various aberrations of the lens system in FIG. 22, on the reduction side, when the projective magnification on the enlargement side is 4x.

FIGS. 22 through 24 show the eighth embodiment of a projector, according to the present invention. FIG. 22 shows a lens arrangement; FIG. 23 shows diagrams of aberrations on the reduction side when the magnification on the enlargement side is 20x; and FIG. 24 shows diagrams of aberrations on the reduction side when the magnification on the enlargement side is 4x, respectively. Numerical data of the lens system of the second embodiment is shown in Table 8 below.

TABLE 8

$F_{NO} = 1:4.8$
$f = 35$ mm
$2\omega = 81.8° \sim 82.2°$

| Surface NO. | R | D | $n_d$ | $v_d$ |
|---|---|---|---|---|
| 1 * | 13.048 | 4.29 | 1.49176 | 57.4 |
| 2 | 18.582 | 5.53 | — | — |
| STOP | ∞ | 6.97 | — | — |
| 3 | 116.489 | 5.52 | 1.58913 | 61.2 |
| 4 | −31.562 | 1.15 | 1.78472 | 25.7 |
| 5 | −105.905 | 17.19 | — | — |
| 6 * * | 87.955 | 1.91 | 1.49176 | 57.4 |
| 7 * * | −17.898 | — | — | — |
| Aspherical data: | | | | |
| NO. 1: | K = 0.0, A4 = 0.56910 × 10⁻⁵, | | | |
| | A6 = 0.80233 × 10⁻⁷, A8 = 0.0 | | | |
| NO. 6: | K = 0.0, A4 = −0.30181 × 10⁻⁵, | | | |
| | A6 = 0.0, A8 = 0.0 | | | |
| NO. 7: | K = −1.00, A4 = −0.35265 × 10⁻⁶, | | | |
| | A6 = −0.17730 × 10⁻⁸, A8 = 0.0 | | | |

* denotes aspherical surface
* * denotes aspherical fresnel surface

EMBODIMENT 9

Figure 25:
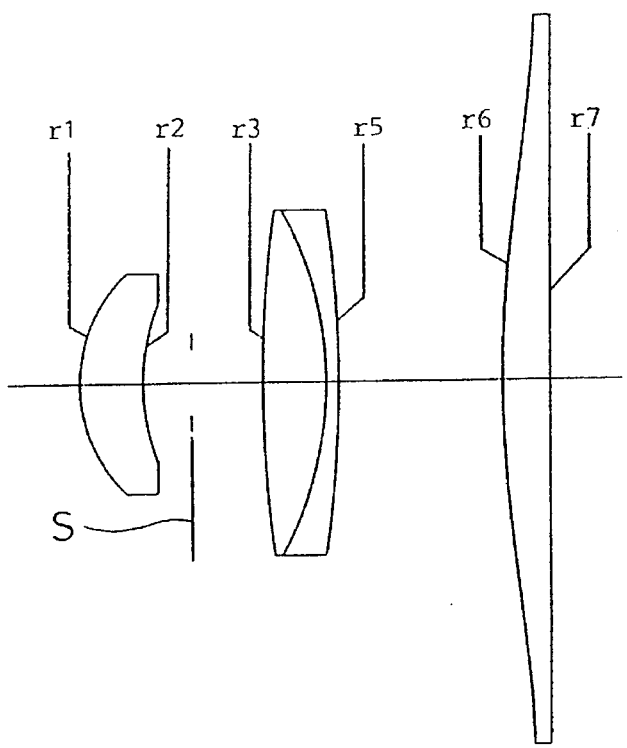
FIG. 25 is a schematic view showing an optical lens arrangement of a projection lens, according to the ninth embodiment of the present invention.
Figure 26:
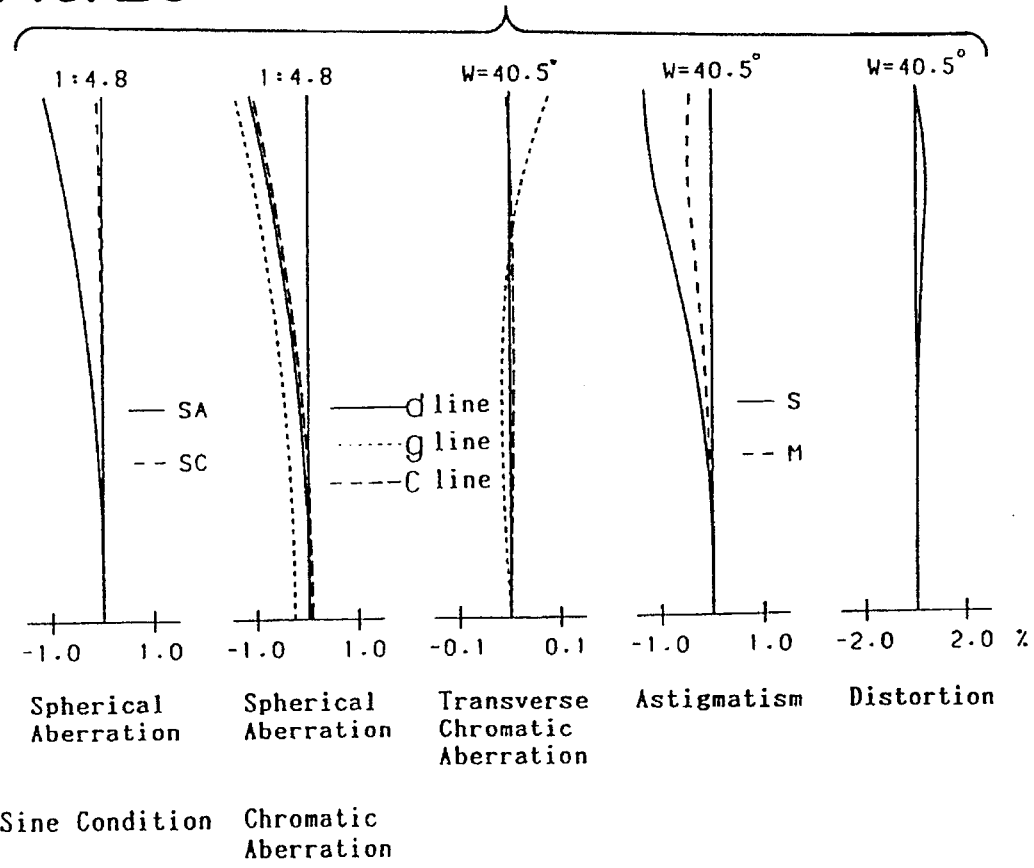
FIG. 26 shows diagrams of various aberrations of the lens system in FIG. 25, on the reduction side, when the projective magnification on the enlargement side is 20x.
Figure 27:
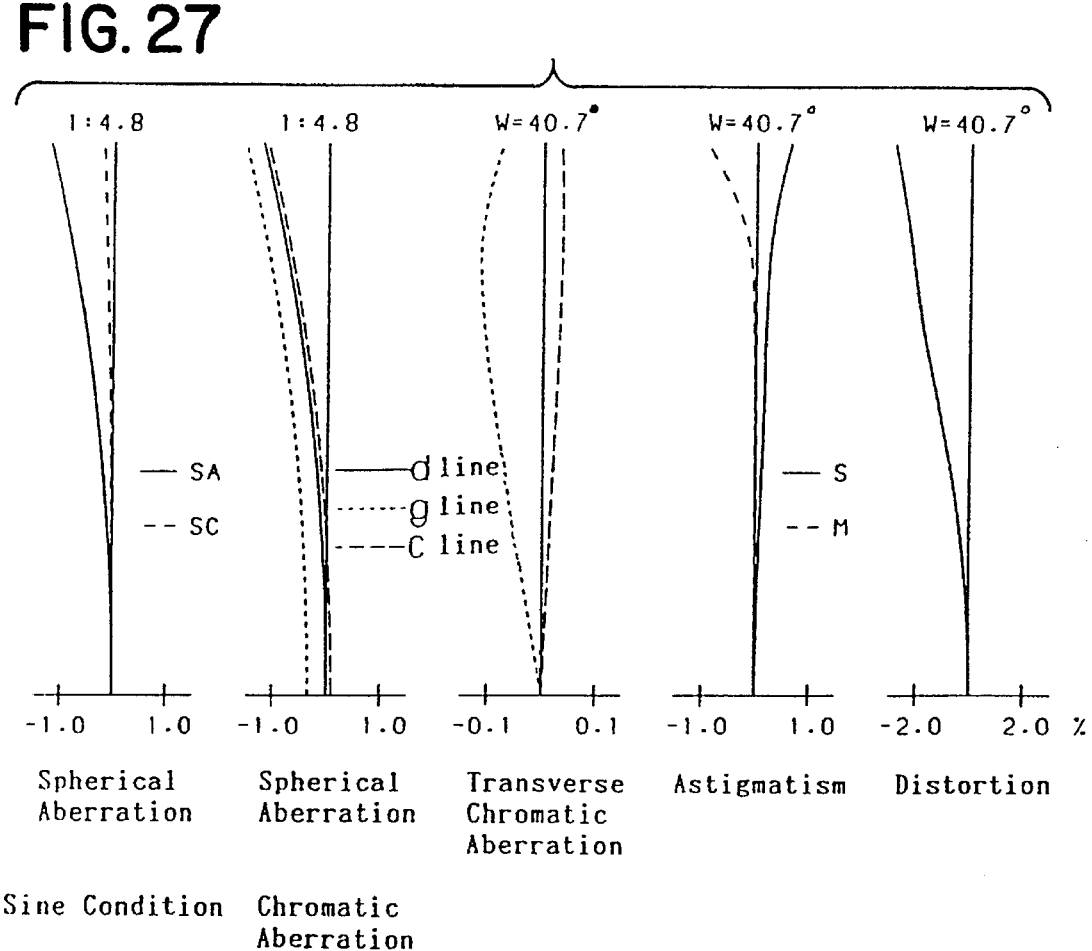
FIG. 27 shows diagrams of various aberrations of the lens system in FIG. 25, on the reduction side, when the projective magnification on the enlargement side is 4x.

FIGS. 25 through 27 show the ninth embodiment of a projector, according to the present invention. FIG. 25 shows a lens arrangement; FIG. 26 shows diagrams of aberrations on the reduction side when the magnification on the enlargement side is 20x; and FIG. 27 shows diagrams of aberrations on the reduction side when the magnification on the enlargement side is 4x, respectively. Numerical data of the lens system of the second embodiment is shown in Table 9 below.

TABLE 9

$F_{NO} = 1:4.8$
$f = 35$ mm
$2\omega = 81° \sim 81.4°$

| Surface NO. | R | D | $n_d$ | $v_d$ |
|---|---|---|---|---|
| 1 * | 13.413 | 5.77 | 1.49176 | 57.4 |
| 2 | 18.009 | 4.48 | — | — |
| STOP | ∞ | 6.57 | — | — |
| 3 | 103.396 | 5.86 | 1.58913 | 61.2 |
| 4 | −30.968 | 1.16 | 1.78472 | 25.7 |
| 5 | −99.201 | 14.98 | — | — |
| 6 * | 97.770 | 4.36 | 1.49176 | 57.4 |
| 7 * * | −17.824 | — | — | — |
| Aspherical data: | | | | |
| NO. 1: | K = 0.0, A4 = 0.87910× 10⁻⁵, | | | |
| | A6 = 0.61388 × 10⁻⁷, A8 = 0.0 | | | |
| NO. 6: | K = 0.0, A4 = −0.24261 × 10⁻⁵, | | | |
| | A6 = 0.0, A8 = 0.0 | | | |
| NO. 7: | K = −1.00, A4 = −0.15008 × 10⁻⁵, | | | |
| | A6 = −0.46840 × 10⁻⁹, A8 = 0.0 | | | |

* denotes aspherical surface
* * denotes aspherical fresnel surface

EMBODIMENT 10

Figure 28:
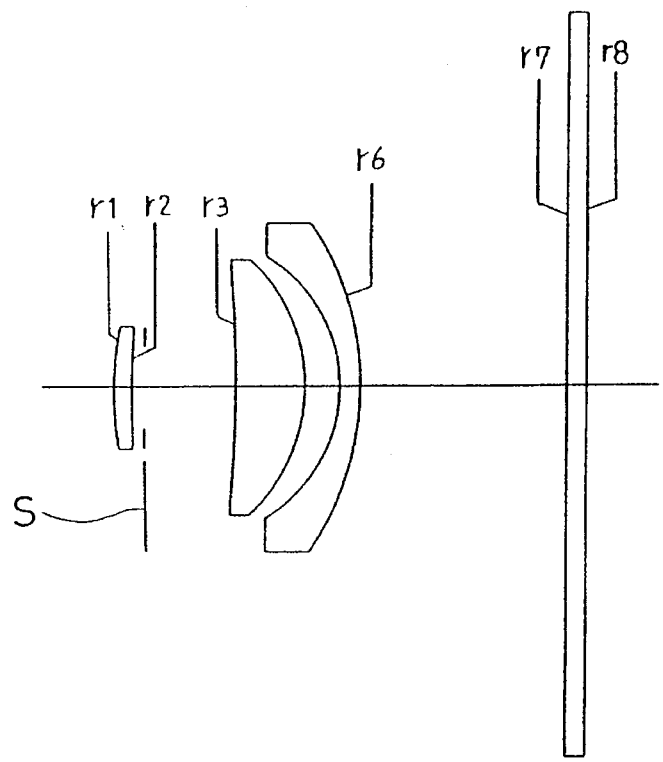
FIG. 28 is a schematic view showing an optical lens arrangement of a projection lens, according to the tenth embodiment of the present invention.
Figure 29:
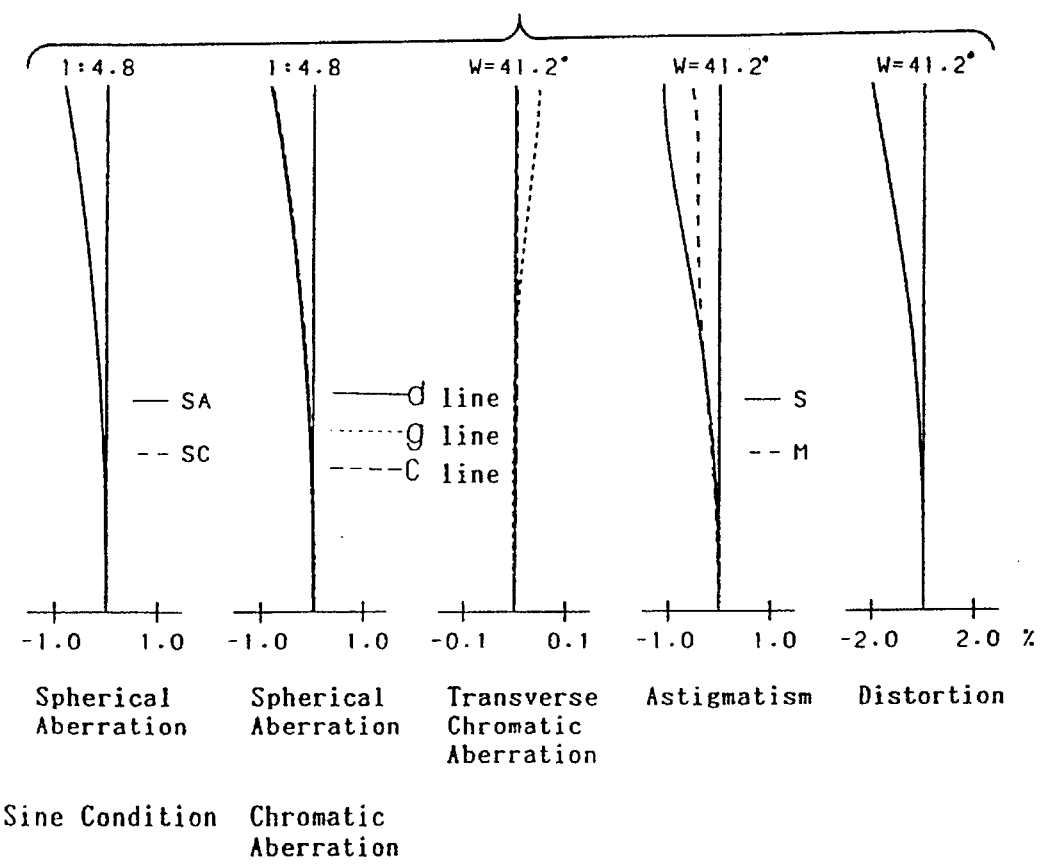
FIG. 29 shows diagrams of various aberrations of the lens system in FIG. 28, on the reduction side, when the projective magnification on the enlargement side is 20x.
Figure 30:
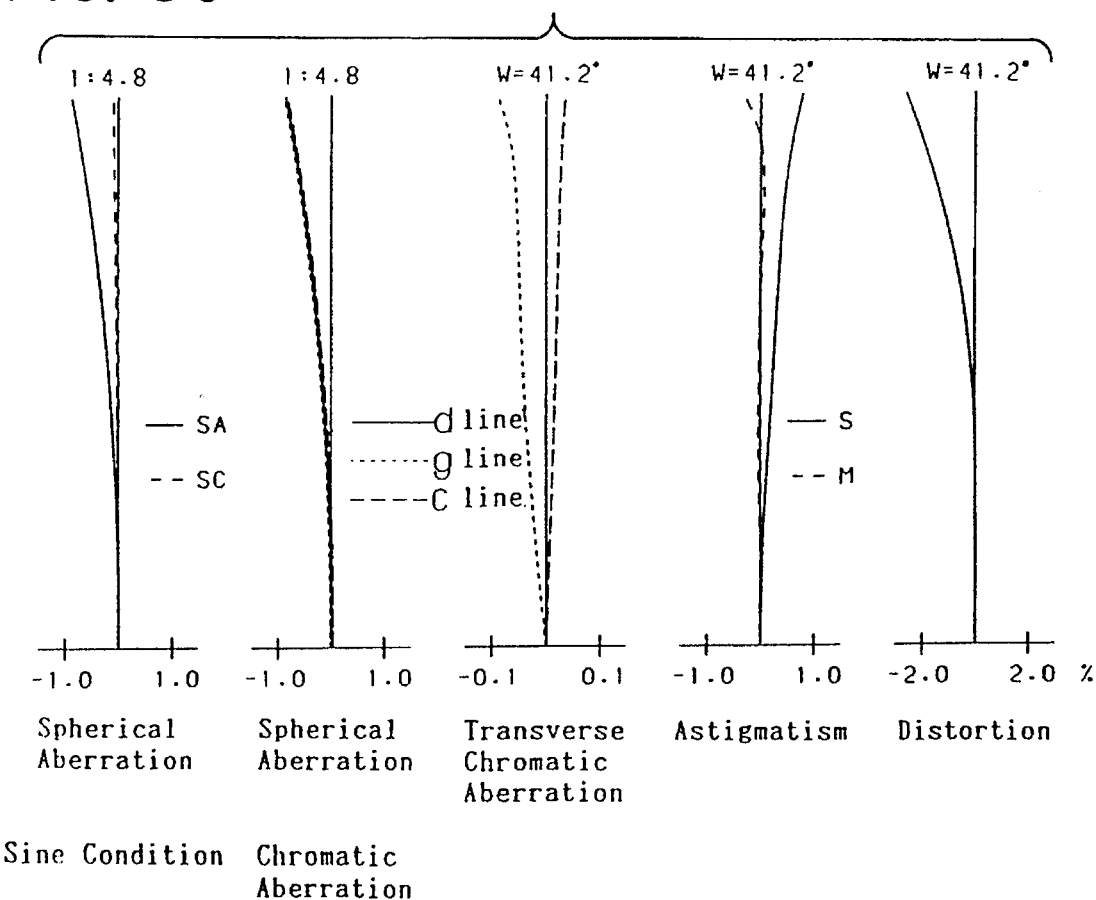
FIG. 30 shows diagrams of various aberrations of the lens system in FIG. 28, on the reduction side, when the projective magnification on the enlargement side is 4x.

FIGS. 28 through 30 show the tenth embodiment of a projector, according to the present invention. FIG. 28 shows a lens arrangement; FIG. 29 shows diagrams of aberrations on the reduction side when the magnification on the enlargement side is 20x; and FIG. 30 shows diagrams of aberrations on the reduction side when the magnification on the enlargement side is 4x, respectively. Numerical data of the lens system of the second embodiment is shown in Table 10 below.

TABLE 10

$F_{NO} = 1:4.8$
$f = 35$ mm
$2\omega = 82.4° \sim 82.4°$

| Surface NO. | R | D | $n_d$ | $v_d$ |
|---|---|---|---|---|
| 1 | 27.166 | 1.67 | 1.48749 | 70.2 |
| 2 | 80.653 | 1.18 | — | — |
| STOP | ∞ | 8.40 | — | — |
| 3 | −114.415 | 6.37 | 1.60311 | 60.7 |
| 4 | −14.821 | 3.16 | — | — |
| 5 | −13.111 | 1.82 | 1.80518 | 25.4 |
| 6 | −25.283 | 18.85 | — | — |
| 7 | ∞ | 1.82 | 1.49176 | 57.4 |
| 8 * * | −18.138 | — | — | — |

Aspherical data:

NO. 8: $K = -1.00$, $A4 = 0.39071 \times 10^{-7}$, $A6 = -0.83651 \times 10^{-9}$, $A8 = 0.0$

* * denotes aspherical fresnel surface

Table 11 below shows numerical values of the formulae (1) through (13) in the above-mentioned embodiments.

TABLE 11

| | Embodiment | | | | |
|---|---|---|---|---|---|
| | 1 | 2 | 3 | 4 | 5 |
| formulae(1) | 2.042 | 1.631 | 2.004 | 2.006 | 2.359 |
| formulae(2) | 3.963 | 4.124 | 2.019 | 2.555 | 2.374 |
| formulae(3) | −0.1440 | −0.2025 | −0.1631 | −0.5893 | 0.1125 |
| formulae(4) | 25.4 | 25.7 | 23.9 | 23.9 | 25.7 |
| formulae(5) | 62.623 | 61.352 | 63.920 | 61.675 | 63.667 |
| formulae(6) | 0.366 | 0.332 | 0.266 | 0.292 | 0.313 |
| | 0.566 | 0.532 | 0.466 | 0.523 | 0.513 |
| formulae(7) | 0.968 | 1.110 | 1.065 | 1.065 | 1.030 |
| formulae(8) | 0.175 | 0.192 | 0.219 | 0.149 | 0.147 |
| formulae(9) | — | — | — | — | — |
| formulae(10) | — | — | — | — | — |
| formulae(11) | 0.687 | 0.7∞ | 0.860 | 0.770 | 0.717 |
| formulae(12) | 1.48749 | 1.53172 | 1.58913 | 1.61271 | 1.58913 |
| formulae(13) | 0.212 | 0.286 | 0.316 | 0.231 | 0.276 |
| | 6 | 7 | 8 | 9 | 10 |
| formulae(1) | 2.509 | 2.205 | 2.027 | 2.159 | 2.377 |
| formulae(2) | 1.854 | 3.806 | 4.569 | 3.935 | 2.829 |
| formulae(3) | 0.0237 | 0.0519 | 0.3005 | 0.3385 | −0.306 |
| formulae(4) | 27.5 | 25.7 | 25.7 | 25.7 | 25.4 |
| formulae(5) | 66.408 | 62.754 | 64.961 | 64.180 | 62.649 |
| formulae(6) | 0.235 | 0.353 | 0.352 | 0.357 | 0.341 |
| | 0.435 | 0.553 | 0.552 | 0.557 | 0.541 |
| formulae(7) | — | — | — | — | — |
| formulae(8) | — | — | — | — | — |
| formulae(9) | 0.446 | 0.342 | 0.373 | 0.383 | 0.776 |
| formulae(10) | 0.267 | 0.244 | 0.357 | 0.316 | 0.274 |
| formulae(11) | 0.679 | 0.577 | 0.561 | 0.567 | 0.763 |
| formulae(12) | 1.51633 | 1.58913 | 1.58913 | 1.58913 | 1.60311 |
| formulae(13) | 0.454 | 0.437 | 0.419 | 0.430 | 0.126 |

As can be understood from the above discussion, according to the present invention, a small, simple, inexpensive, and high quality wide angle projection lens, comprised of a small number of elements, and having a half angle of view of approximately 40°, can be provided.

We claim:

1. A projection lens assembly comprising:

an imaging lens group including a first lens group having a positive refractive power, and a second lens group having a positive refractive power; and, a Fresnel lens group having a positive refractive power and at least one Fresnel lens surface, said imaging lens group and said Fresnel lens group being arranged in this order from an enlargement side;

said projection lens satisfying the following relationships:

$1.4 < f_1/f < 2.8$, and $1.5 < f_2/f < 2.0$ wherein f represents the focal length of the whole lens assembly, $f_1$ represents the focal length of the first lens group, and $f_2$ represents the focal length of the second lens group.

2. A projection lens according to claim 1, wherein said second lens group consists of a first lens element having a positive refractive power, a second lens element having a negative refractive power, and a third lens element having a positive refractive power, from the enlargement side, and satisfies the following relationships:

$-1.0 < f/r_{21} < 0.5$, and $v_2 < 30$ wherein $r_{21}$ represents the radius of curvature of the lens surface of said first lens element on the enlargement side, and $v_2$ represents the Abbe number of said second lens element.

3. A projection lens according to claim 1, wherein said second lens group consists of a first lens element having a positive refractive power, and a second lens element having a negative refractive power, from the enlargement side, and satisfies the following relationships:

$-1.0 < f/r_{21} < 0.5$, and $\mu_2 < 30$ wherein $r_{21}$ represents the radius of curvature of the lens surface of said second lens element on the enlargement side, and $v_2$ represents the Abbe number of said second lens element.

4. A projection lens assembly comprising:

an imaging lens group having a positive refractive power; and, a Fresnel lens group having a positive refractive power and at least one Fresnel lens surface, said imaging lens group and said Fresnel lens group being arranged in this order from an enlargement side;

wherein a surface of the Fresnel lens group having a strongest refractive power is the Fresnel lens surface, which is provided on the lens surface on a reduction side, and satisfies the following relationships:

$50° < \theta < 70°$, and $0.2 < f_t/f < 0.6$ wherein θ represents the angle defined between the optical axis and the line normal to the Fresnel lens surface at the portion of the Fresnel lens surface furthest from the optical axis, f represents the focal length of the whole lens assembly and $f_b$ represents the distance between the surface of the Fresnel lens group having the strongest refractive power and the conjugate plane on the reduction side.

5. A projection lens according to claim 4, said imaging lens group further comprising:

a first lens group having a positive refractive power;

a second lens group having a positive refractive power; and a diaphragm provided between said first and second lens groups to restrict a bundle of light beams.

6. A projection lens according to claim 4, wherein a lens surface of said Fresnel lens group on the enlargement side has a weaker refractive power than that of a lens surface on the reduction side.

7. A projection lens according to claim 6, wherein said lens surface of the Fresnel lens group on the enlargement side is an aspherical surface.

8. A projection lens according to claim 4, wherein a surface of the Fresnel lens group on the enlargement side is a Fresnel lens surface having a weaker refractive power than that of a lens surface on the reduction side.

9. A projection lens according to claim 1, wherein the first lens group consists of a first lens element made of a meniscus lens whose convex surface is oriented toward the enlargement side and has a positive refractive power, and a second lens element of a positive refractive power provided with a convex surface on the enlargement side, in this order from the enlargement side, wherein said projection lens satisfies the following relationships:

$$0.8 < r_{11}/r_{12} < 1.2, \text{ and}$$

$$0.1 < d_1/f < 0.25$$

wherein $r_{11}$ represents the radius of curvature of the lens surface of said first lens element on the enlargement side, $r_{12}$ represents the radius of curvature of the lens surface of said first lens element on a reduction side, and $d_1$ represents a whole length of the first lens group.

10. A projection lens according to claim 1, wherein said first lens group consists of a first lens element group made of cemented positive and negative lenses and a second lens element of a positive refractive power having a convex surface on the enlargement side, from the enlargement side, and satisfies the following relationships:

$$0.8 < r_{11}/r_{12} < 1.2, \text{ and}$$

$$0.1 < d_1/f < 0.25$$

wherein $r_{11}$ represents the radius of curvature of the lens surface of said first lens element group on the enlargement side, $r_{12}$ represents the radius of curvature of the lens surface of said first lens element on the reduction side, and $d_1$ represents a whole length of the first lens group.

11. A projection lens according to claim 1, wherein said first lens group comprises one meniscus lens of a positive refractive power having a convex surface on the enlargement side and satisfies the following relationships:

$$0.3 < r_1/f < 1.0, \text{ and}$$

$$0.2 < d_{12}/f < 0.4$$

wherein $r_1$ represents the radius of curvature of a lens surface of said meniscus lens on the enlargement side, $d_{12}$ represents the spatial distance between said first lens group and said second lens group.

12. A projection lens according to claim 1, wherein said first lens group is provided with an aspherical surface.

13. A projector including a projection lens assembly according to claim 1, further comprising:

a transparent liquid crystal panel located on the reduction side;

a screen located on the enlargement side; and said liquid crystal panel and said screen being conjugate with each other, whereby light incident upon the transparent liquid crystal panel is projected onto said screen through said Fresnel lens group and said imaging lens group.

14. A projector according to claim 13, wherein said Fresnel lens group and said imaging lens group move relative to said transparent liquid crystal panel, so that light beams transmitted through said transparent liquid crystal panel and gathered by the Fresnel lens group, are incident upon an entrance pupil of the imaging lens group at any projection distance.

15. A projector comprising:

a light source;

a transparent liquid crystal panel;

a Fresnel lens group having a positive refractive power and at least one Fresnel lens surface;

an imaging lens group including a first lens group having a positive refractive power and a second lens group having a positive refractive power; and, a screen on which light beams emitted from said light source, transmitted through said transparent liquid crystal panel and gathered by the Fresnel lens group, are projected;

wherein said Fresnel lens and said imaging lens satisfy the following relationships:

$$1.4 < f_1/f < 2.8, \text{ and}$$

$$1.5 < f_2/f < 6.0$$

wherein f represents the focal length of the whole lens system of said Fresnel lens and said imaging lens, $f_1$ represents the focal length of said first lens group, and $f_2$ represents the focal length of said second lens group.

16. A projector according to claim 15, wherein said Fresnel lens group and said imaging lens group move relative to said transparent liquid crystal panel, so that light beams incident upon said imaging lens group are incident upon an entrance pupil of said imaging lens group at any projection distance.

* * * * *

UNITED STATES PATENT AND TRADEMARK OFFICE
CERTIFICATE OF CORRECTION

PATENT NO. : 5,600,488
DATED : February 4, 1997
INVENTOR(S) : N. MINEFUJI et al.

It is certified that error appears in the above-indentified patent and that said Letters Patent is hereby corrected as shown below:

At column 16, line 46 (claim 3, line 7), change "$\mu_2 < 30$" to ---$v_2 < 30$---.

At column 18, line 47 (claim 15, line 15), change "$1.4 < f_f f < 2.8$" to ---$1.4 < f_1/f < 2.8$---.

Signed and Sealed this

Thirteenth Day of May, 1997

*Attest:*

BRUCE LEHMAN

*Attesting Officer*     Commissioner of Patents and Trademarks